(12) United States Patent
Sakurai

(10) Patent No.: US 7,643,701 B2
(45) Date of Patent: Jan. 5, 2010

(54) IMAGING APPARATUS FOR CORRECTING A DISTORTION OF AN IMAGE

(75) Inventor: Keiichi Sakurai, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 620 days.

(21) Appl. No.: 11/216,964

(22) Filed: Aug. 31, 2005

(65) Prior Publication Data

US 2006/0043264 A1 Mar. 2, 2006

(30) Foreign Application Priority Data

Sep. 2, 2004 (JP) ............................. 2004-256180

(51) Int. Cl.
*G06K 9/36* (2006.01)
*G06K 9/20* (2006.01)
*G06K 9/32* (2006.01)

(52) U.S. Cl. .................... 382/282; 382/276; 382/293

(58) Field of Classification Search ................ 382/190, 382/199, 276, 293, 294, 282
See application file for complete search history.

(56) References Cited

U.S. PATENT DOCUMENTS

| | | | | |
|---|---|---|---|---|
| 4,256,959 A | * | 3/1981 | Monette | 250/235 |
| 4,641,199 A | * | 2/1987 | Miyagi | 358/483 |
| 5,019,917 A | * | 5/1991 | Hata et al. | 358/448 |
| 5,995,677 A | * | 11/1999 | Jones | 382/276 |
| 6,473,198 B1 | * | 10/2002 | Matama | 358/1.9 |
| 6,490,024 B1 | * | 12/2002 | Ohno | 355/27 |
| 6,529,639 B1 | * | 3/2003 | Young | 382/276 |
| 6,606,422 B1 | * | 8/2003 | Dulin et al. | 382/282 |
| 6,650,442 B1 | * | 11/2003 | Chiu | 358/474 |
| 6,674,902 B1 | * | 1/2004 | Kondo et al. | 382/199 |
| 6,683,703 B1 | * | 1/2004 | Iwai | 358/461 |
| 6,847,382 B2 | * | 1/2005 | Chong et al. | 345/660 |
| 6,959,385 B2 | * | 10/2005 | Murakami et al. | 713/176 |
| 7,003,159 B2 | * | 2/2006 | Yamaai | 382/199 |
| 7,369,691 B2 | * | 5/2008 | Kondo et al. | 382/128 |
| 7,382,399 B1 | * | 6/2008 | McCall et al. | 348/207.99 |
| 2002/0150307 A1 | * | 10/2002 | Hamburg | 382/282 |
| 2005/0063575 A1 | * | 3/2005 | Ma et al. | 382/128 |
| 2006/0043264 A1 | | 3/2006 | Sakurai | 250/208.1 |
| 2006/0067588 A1 | * | 3/2006 | Makino et al. | 382/276 |
| 2006/0152587 A1 | * | 7/2006 | Kondo et al. | 348/207.99 |
| 2007/0177818 A1 | * | 8/2007 | Teshima et al. | 382/276 |

FOREIGN PATENT DOCUMENTS

| | | |
|---|---|---|
| JP | 2000-022869 A | 1/2000 |
| JP | 2002-354331 A | 12/2002 |

OTHER PUBLICATIONS

Japanese Office Action (and English translation thereof) dated Mar. 4, 2008, issued in a counterpart Japanese Application.

* cited by examiner

*Primary Examiner*—Andrew W Johns
*Assistant Examiner*—Mia M Thomas
(74) *Attorney, Agent, or Firm*—Frishauf, Holtz, Goodman & Chick, P.C.

(57) ABSTRACT

A document camera (1) detects a figure of a known shape on a stage (13) and acquires the coordinates of the figure, and acquires image processing area and projection correction parameter. The document camera (1) extracts image data of the image processing area from image data acquired by shooting the stage (13) and an original (4), and performs projection correction on the image data using the projection correction parameter. Further, the document camera (1) performs rotation correction on image data undergone projection correction. Furthermore, the document camera (1) performs zoom correction on image data undergone rotation correction, and generates output input image.

13 Claims, 34 Drawing Sheets

$$q(k, 1) = \frac{1}{9} \times \sum_{x=X-1}^{X+1} \sum_{y=Y-1}^{Y+1} p(x, y)$$

X=Round((k-0.5) * Xbmax/Xsmax)
Y=Round((k-0.5) * Xbmax/Xsmax)

WHERE Round IS FUNCTION WHICH ROUNDS OFF DICIMAL POINTS
(Xbmax, Ybmax): SIZE OF IMAGE DATA BEFORE REDUCTION
(Xsmax, Ysmax): SIZE OF IMAGE DATA UNDERGONE REDUCTION
p (x, y): PIXEL VALUE AT COORDINATES (x, y) OF IMAGE DATA UNDERGONE REDUCTION

FIG.31A $$g(x, y) = \sqrt{(\Delta 1)^2 + (\Delta 2)^2}$$
$$= \sqrt{f(x, y) - f(x+1, y-1))^2 + (f(x+1, y) - f(x, y-1))^2}$$

$\Delta 1 = 1 \cdot f(x, y) + 0 \cdot f(x+1, y) + 0 \cdot f(x, y-1) - 1 \cdot f(x+1, y-1)$
    $= f(x, y) - f(x+1, y-1)$
$\Delta 2 = 0 \cdot f(x, y) + 1 \cdot f(x+1, y) - 1 \cdot f(x, y-1) + 0 \cdot f(x+1, y-1)$
    $= f(x+1, y) - f(x, y-1)$ WHERE g(x, y): PIXEL VALUE CORRESPONDING TO COORDINATES (x,y) UNDERGONE TRANSFORM
f(x, y): PIXEL VALUE CORRESPONDING TO COORDINATES (x, y) BEFORE TRANSFORM

FIG.31A $$h(x, y) = \begin{cases} 1 & \text{when } g(x, y) \geq g\_th \\ 0 & \text{when } g(x, y) < g\_th \end{cases}$$

FIG.32A  $\rho = x\cos\theta + y\sin\theta$

FIG.32B
| TOP SIDE | $60° \leq \theta < 120°$ | $\rho > 0$ |
| BOTTOM SIDE | $60° \leq \theta < 120°$ | $\rho < 0$ |
| RIGHT SIDE | $150° \leq \theta < 210°$ | $\rho > 0$ |
| LEFT SIDE | $150° \leq \theta < 210°$ | $\rho < 0$ |

FIG.33  $MD = \sum_{x=1}^{1024} \sum_{y=1}^{768} |P_n(x,y) - P_{n-1}(x,y)|$

FIG.34A
$$(x', y', z') = (u, v, 1) \cdot A$$
$$A = \begin{pmatrix} a_{11} & a_{12} & a_{13} \\ a_{21} & a_{22} & a_{23} \\ a_{31} & a_{32} & a_{33} \end{pmatrix}$$

FIG.34B
$$x = \frac{x'}{z'} = \frac{a_{11}u + a_{21}v + a_{31}}{a_{13}u + a_{23}v + a_{33}}$$
$$y = \frac{y'}{z'} = \frac{a_{12}u + a_{22}v + a_{32}}{a_{13}u + a_{23}v + a_{33}}$$

FIG. 35A

$A = Azm \cdot Arf \cdot Atp$

Atp: PROJECTION CORRESPONDING PARAMETER
Arf: ROTATION CORRECTION PARAMETER
Azm: ZOOM PARAMETER

FIG. 35B $(x, y, z) = (u, v, 1) \cdot A$

FIG. 36A $(x, y, z) = (U, V, 1) \cdot Atp$

FIG. 36B $(U, V, w) = (p, q, 1) \cdot Arf$

FIG. 36C $(p, q, r) = (u, v, 1) \cdot Azm$

WHERE WITH COORDINATES OF POINT p OF ONE OF IMAGE BEING p(x, y),
kx: DECIMAL VALUE OF x
ky: DECIMAL VALUE OF y
X: INTEGER PART (x)
Y: INTEGER PART (y)

FIG.38A $\begin{cases} x = u\dfrac{f}{w} \\ y = v\dfrac{f}{w} \end{cases}$

FIG.38B
$\begin{cases} Su = k1 \cdot x0 \\ Sv = k1 \cdot y0 \\ Sw = k1 \cdot f \end{cases}$ $\begin{cases} Au = k1 \cdot \{x1 - x0 + \alpha \cdot x1\} \\ Av = k1 \cdot \{y1 - y0 + \alpha \cdot y1\} \\ Aw = k1 \cdot \alpha \cdot f \end{cases}$ $\begin{cases} Bu = k1 \cdot \{x3 - x0 + \beta \cdot x3\} \\ Bv = k1 \cdot \{y3 - y0 + \beta \cdot y3\} \\ Bw = k1 \cdot \beta \cdot f \end{cases}$ WHERE $k1 = \dfrac{Sw}{f}$

FIG.38C

$\alpha = \dfrac{(x0 - x1 + x2 - x3)(y3 - y2) - (x3 - x2)(y0 - y1 + y2 - y3)}{(x1 - x2)(y3 - y2) - (x3 - x2)(y1 - y2)}$ $\beta = \dfrac{(x1 - x2)(y0 - y1 + y2 - y3) - (x0 - x1 + x2 - x3)(y1 - y2)}{(x1 - x2)(y3 - y2) - (x3 - x2)(y1 - y2)}$

FIG.39A  $P = S + m \cdot A + n \cdot B$

WHERE  m: COEFFICIENT OF VECTOR A ($0 \leq m \leq 1$)
       n: COEFFICIENT OF VECTOR B ($0 \leq n \leq 1$)

FIG.39B
$$\begin{cases} x = \dfrac{m \cdot (x1 - x0 + \alpha \cdot x1) + n \cdot (x3 - x0 + \beta \cdot x3) + x0}{1 + m \cdot \beta + n \cdot \alpha} \\ y = \dfrac{m \cdot (y1 - y0 + \alpha \cdot y1) + n \cdot (y3 - y0 + \beta \cdot y3) + y0}{1 + m \cdot \alpha + n \cdot \beta} \end{cases}$$

FIG.39C
$$(x', y', z') = (m, n, 1) \begin{pmatrix} x1 - x0 + \alpha \cdot x1 & y1 - y0 + \alpha \cdot y1 & \alpha \\ x3 - x0 + \beta \cdot x3 & y3 - y0 + \beta \cdot y3 & \beta \\ x0 & y0 & 1 \end{pmatrix}$$

FIG.39D
$$\begin{cases} m = \dfrac{U}{Usc} \\ n = \dfrac{V}{Vsc} \end{cases}$$

FIG.40A $$(x', y', z') = (u, v, 1) \begin{pmatrix} \frac{1}{Usc} & 0 & 0 \\ 0 & \frac{1}{Vsc} & 0 \\ 0 & 0 & 1 \end{pmatrix} \begin{pmatrix} x1-x0+\alpha \cdot x1 & y1-y0+\alpha \cdot y1 & \alpha \\ x3-x0+\beta \cdot x3 & y3-y0+\beta \cdot y3 & \beta \\ x0 & y0 & 1 \end{pmatrix}$$

FIG.40B $$Atp = \begin{pmatrix} \frac{1}{Usc} & 0 & 0 \\ 0 & \frac{1}{Vsc} & 0 \\ 0 & 0 & 1 \end{pmatrix} \begin{pmatrix} x1-x0+\alpha \cdot x1 & y1-y0+\alpha \cdot y1 & \alpha \\ x3-x0+\beta \cdot x3 & y3-y0+\beta \cdot y3 & \beta \\ x0 & y0 & 1 \end{pmatrix}$$

FIG.41

$$(x', y', z') = (u, v, 1) \begin{pmatrix} \frac{1}{ku} & 0 & 0 \\ 0 & \frac{1}{kv} & 0 \\ 0 & 0 & 1 \end{pmatrix} \begin{pmatrix} x1-x0+\alpha \cdot x1 & y1-y0+\alpha \cdot y1 & \alpha \\ x3-x0+\beta \cdot x3 & y3-y0+\beta \cdot y3 & \beta \\ x0 & y0 & 1 \end{pmatrix}$$

WHERE when $\frac{Vsmax}{Usmax} \geq \frac{usc}{vsc}$ then $ku = Usmax$, $kv = Usmax \times \frac{vsc}{usc}$ when $\frac{Vsmax}{Usmax} < \frac{usc}{vsc}$ then $ku = Vsmax \times \frac{usc}{vsc}$, $kv = Vsmax$

FIG.42 $$At = \begin{pmatrix} \frac{1}{ku} & 0 & 0 \\ 0 & \frac{1}{kv} & 0 \\ 0 & 0 & 1 \end{pmatrix} \begin{pmatrix} x1-x0+\alpha \cdot x1 & y1-y0+\alpha \cdot y1 & \alpha \\ x3-x0+\beta \cdot x3 & y3-y0+\beta \cdot y3 & \beta \\ x0 & y0 & 1 \end{pmatrix}$$

FIG.43A

$(p, q, 1) = (U, V, 1) \cdot Ari$ $$Ari = \begin{pmatrix} \cos(-\theta p) & \sin(-\theta p) & 0 \\ -\sin(-\theta p) & \cos(-\theta p) & 0 \\ 0 & 0 & 1 \end{pmatrix}$$

FIG.43B

$(U, V, 1) = (p, q, 1) \cdot Ar$ $$Ar = \begin{pmatrix} \cos\theta p & \sin\theta p & 0 \\ -\sin\theta p & \cos\theta p & 0 \\ 0 & 0 & 1 \end{pmatrix}$$

FIG.44A $\begin{cases} p_L = \min_i(p_i) \\ q_L = \min_i(q_i) \end{cases}$ $\begin{cases} p_H = \max_i(p_i) \\ q_H = \max_i(q_i) \end{cases}$

FIG.44B $A_{rf} = \begin{pmatrix} s_c & 0 & 0 \\ 0 & s_c & 0 \\ u_L & v_L & 1 \end{pmatrix} \cdot \begin{pmatrix} \cos\theta p & \sin\theta p & 0 \\ -\sin\theta p & \cos\theta p & 0 \\ 0 & 0 & 1 \end{pmatrix}$

FIG.44C $S_c = \begin{cases} \dfrac{p_H - p_L}{u_{max}} & \text{when } \dfrac{u_{max}}{v_{max}} < \dfrac{p_H - p_L}{q_H - q_L} \\ \dfrac{q_H - q_L}{v_{max}} & \text{when } \dfrac{u_{max}}{v_{max}} \geq \dfrac{p_H - p_L}{q_H - q_L} \end{cases}$ $u_L = p_L \quad v_L = q_L$

FIG.45A $\quad Azm = \begin{pmatrix} \frac{1}{Zoom} & 0 & 0 \\ 0 & \frac{1}{Zoom} & 0 \\ Cx & Cy & 1 \end{pmatrix}$

FIG.45B $\begin{cases} \text{when} \quad Zoom < 1 \\ \qquad\qquad\qquad \text{then } Zoom = 1 \\ \text{when} \quad Zoom > MAX\_ZOOM\_RATIO \\ \qquad\qquad\qquad \text{then } Zoom = ZOOM\_RATIO \end{cases}$

FIG.45C $\begin{cases} \text{when} \quad Cx < 0 \qquad\quad \text{then} \quad Cx = 0 \\ \text{when} \quad Cx < umax \quad \text{then} \quad Cy = 0 \\ \text{when} \quad Cy < 0 \qquad\quad \text{then} \quad Cx = umax \\ \text{when} \quad Cx > vmax \quad \text{then} \quad Cx = vmax \end{cases}$

IMAGING APPARATUS FOR CORRECTING A DISTORTION OF AN IMAGE

BACKGROUND OF THE INVENTION

1. Field of the Invention

The present invention relates to an imaging apparatus, image processing method for the imaging apparatus, and a program which are suitable for correcting a distortion of an image obtained through shooting of an object like an original.

2. Description of the Related Art

Recently has been used an imaging apparatus, which shoots an original or the like placed by a user on a stage on which an object is to be placed. An imaging apparatus, which performs image processing on an obtained image, and outputs image data undergone the image processing to an output device like a projector, thereby projecting the image on a screen.

For example, Unexamined Japanese patent Application KOKAI Publication No. 2002-354331 discloses an imaging apparatus which shoots an original from an oblique direction, and corrects the distortion of an obtained image. In the imaging processing apparatus, as shown in FIGS. 27A and 27B, the pole brace 52 is movable so as to change the direction of the camera section 51. For example, as shown in FIG. 27A, when the camera section 51 is provided directly overhead eth original stage 53, and an original like a piece of paper placed on the original stage 53 is shot by the camera section 51, an image as shown in FIG. 28A can be obtained.

For example, a shadow of the camera section 51 may appear on an image shot by the camera section 51 by some directions of a light or the like in a room on which the imaging apparatus is placed. In this case, as shown in FIG. 27B, the camera section 51 is placed obliquely upward on the original, not directly overhead of the original. When the camera section 51 is placed in such way, and the original placed on the original stage 53 is shot, an image as shown in FIG. 28B can be obtained.

The imaging apparatus generates an image, corresponding to the original as shown in FIG. 28C, from the shot image shown in FIG. 28A or 28B. Like this case, when the image including the original and obtained through shooting is distorted, the imaging apparatus performs a Keystone Correction (trapezoidal distortion correction). The Keystone correction features to clip an image corresponding to the original from the shot image such as shown in FIG. 28A or 28B, and converts the image in such a way that a trapezoid represented by the outline of the clipped image is to be a rectangular.

When the original is an oblong, the imaging apparatus acquires projection correction parameter from four of the apex coordinates of the outline of the extracted image which includes the original. Using the projection correction parameter, the imaging apparatus performs the projection correction. The projection correction converts an image of an object, shot from a spatial oblique direction, into an image to be obtained in shooting from the front. As mentioned, the conventional imaging apparatus acquires the projection correction parameter on the assumption that the oblong original entirely appears within the shooting range of the camera, and the straight line corresponding to the outline of the original is detectable.

If a portion of the original is out from the shooting range, the imaging apparatus cannot correctly acquires the outline of the original, thereby failing to acquire a correct projection correction parameter. As shown in FIG. 29A, if a portion of the original is warped, the shape of the original shot by the camera does not become an oblong, and the imaging apparatus cannot acquire a correct projection correction parameter. That is, the imaging apparatus is to acquire the shape of the original based on an incorrectly detected outline 2901.

For example, when carrying out projection correction using the image of the original whose portion is warped, the imaging apparatus cannot correctly acquire a straight line which corresponds to the warped portion. Accordingly, in performing projection correction and a Keystone correction on that image, as shown in FIG. 29B, the image of the original is distorted.

As mentioned, in the conventional technique, as the projection correction parameter is acquired by detecting a straight line or an apex represented by the outline of the original itself, an accurate projection correction cannot be performed.

SUMMARY OF THE INVENTION

The invention has been made in view of such a conventional problem, and, it is an object of the present invention to provide an imaging apparatus, image processing method for the imaging apparatus, and a program which are suitable for correcting a distortion of an image obtained through shooting of an object like an original.

To achieve the object, an imaging apparatus, according to the first aspect of the invention, is an imaging apparatus which comprises:

an area acquisition section (203) which acquires an area from which an image is to be extracted, based on an input image including an original (4), placed on a stage (13) including a figure of a known shape and acquired by shooting the stage (13) and the original (4) from an oblique direction, and the figure;

an extraction section (203) which eats from the input image an image of a portion corresponding to the area acquired by the area acquisition section (203);

a parameter acquisition section (203) which acquires a parameter for correcting the image extracted by the extraction section (203) to an image of the original (4) as seen from the front; and a correction section (203) which corrects the image extracted by the extraction section (203) to the image of the original (4) as seen from the front using the parameter acquired by the parameter acquisition section (203).

The stage (13) may comprise a figure of a known shape, and the area acquisition section (203) may acquire an area in the input image which corresponds to the stage (13), to acquire an area from which an image is to be extracted.

The figure of the known shape may be laid out on a surface of that portion of the stage (13) where the original (4) is to be placed, and the area acquisition section (203) may acquire an area in the input image which corresponds to the figure to acquire an area from which an image is to be extracted.

Plural marks of known shapes may be laid out on a surface of that portion of the stage (13) where the original (4) is to be placed, and The area acquisition section (203) may acquire a figure whose apexes are positions of the plural marks from the input image, further acquire an area in the input image which is occupied by the figure to acquire an area from which an image is to be extracted.

The area acquisition section (203) may acquire straight lines representing a boundary portion between an area occupied by the stage (13) and an area occupied by the original (4) from the input image, and acquire an area figure to figure to acquire an area occupied by a figure surrounded by the straight lines to acquire an area from which an image is to be extracted.

The area acquisition section (203) may acquire straight lines representing a boundary portion between an area occupied by the stage (13) and an image area occupied by the original (4) from the input image, upon acquisition of straight lines representing a boundary portion between the area occupied by the stage (13) and an area occupied by the original (4), acquire an area surrounded by the straight lines or a contour straight line of the stage (13) to acquire an area from which an image is to be extracted, and when the straight lines representing the boundary portion between the area occupied by the stage (13) and the area occupied by the original (4) are not acquired, acquire an area surrounded by the contour straight line of the stage (13) to acquire an area from which an image is to be extracted.

The imaging apparatus may further comprise a storage section (201) which prestores data indicating an area to be acquired by the area acquisition section (203); and wherein the area acquisition section (203) may read the data indicating the area from the storage section (201), and acquire an area from which an image is to be extracted.

The imaging apparatus may further comprise a parameter memory section (201) which stores a parameter acquired by the parameter acquisition section (203), and wherein the correction section (203) may read the parameter stored in the parameter memory section (201), and correct image data extracted by the extraction section (203) to an image of the original (4) as seen from the front using the read parameter.

The extraction section (203) may extract from the input image an image of a portion corresponding to the area acquired by the area acquisition section (203), and further compress the extracted image by performing a statistical process on values associated with individual pixels included in each range represented by a set of pixels constituting the extracted image, range by range, and generates an image to be subjected to image processing by the correction section (203).

The correction section (203) may read the parameter stored in the parameter memory section (201), and perform image processing of correcting the image extracted by the extraction section (203) to an image of the original (4) as seen from the front using the parameter acquired by the parameter acquisition section (203), and further compress the image acquired by image processing by performing a statistical process on values associated with individual pixels included in each range represented by a set of pixels constituting the image acquired by image processing, range by range.

The imaging apparatus may further comprise a change acquisition section (203) which computes a change in an image based on a first image to be acquired by shooting the stage (13) including a figure of a known shape, and the original (4) placed on the stage (13) at a first timing, and a second image to be acquired by shooting the stage (13) and the original (4) at a second timing different from the first timing, and wherein when the change acquired by the change acquisition section (203) is greater than a preacquired threshold, the extraction section (203) may compress the first image by performing a statistical process on values associated with individual pixels included in each range represented by a set of pixels constituting the first image, range by range, and generate an image to be subjected to image processing by the correction section (203).

The imaging apparatus may further comprise:

a change acquisition section (203) which computes a change in image data based on a first image to be acquired by shooting the stage (13) including a figure of a known shape, and the original (4) placed on the stage (13) at a first timing, and a second image to be acquired by shooting the stage (13) and the original (4) at a second timing different from the first timing, and a processing section (203) which compresses the first image by performing a statistical process on values associated with individual pixels included in each range represented by a set of pixels constituting the first image, range by range, when the change acquired by the change acquisition section (203) is greater than a preacquired threshold.

The imaging apparatus may further comprise:

a rotation parameter acquisition section (203) which acquires a parameter for rotating an image, obtained through image processing by the correction section (203), on a plane; and rotation correction section (203) which rotates the image obtained through image processing by the correction section (203) by using the parameter acquired by the rotation parameter acquisition section (203).

The imaging apparatus may further comprise:

a zoom parameter acquisition section (207) which acquires a parameter for zooming up or down an image, obtained through image conversion by the correction section (203), on a plane; and a zoom correction section (207) which zooms up or down the image obtained through image processing by the correction section (203) by using the parameter acquired by the zoom parameter acquisition section (207).

The imaging apparatus may further comprise:

a zoom parameter acquisition section (207) which acquires a parameter for zooming up or down an image, obtained through image conversion by the rotation correction section (203), on a plane; and a zoom correction section (207) which zooms up or down the image obtained by rotation by the rotation correction section (203) by using the parameter acquired by the zoom parameter acquisition section (207).

The imaging apparatus may further comprise:

an imaging section (21) which acquires an input image by shooting the stage (13) including a figure of a known shape and the original (4), placed on the stage (13);

a pole brace (12) on which the imaging section (21) is mounted; and a tilt detection section (205) which detects a change in tilting of the pole brace (12), and wherein when the change is greater than a preacquired value, the parameter acquisition section (203) may acquire a parameter for correcting the input image to an image as seen from the front, and the correction section (203) may correct the input image to an image of the original (4) as seen from the front using the parameter extracted by the parameter acquisition section (203).

To achieve the object, image processing method, according to the second aspect of the invention, is image processing method for an imaging apparatus which comprises:

an area acquisition step (203) of acquiring an area from which an image is to be extracted, based on an input image including an original (4), placed on a stage (13) including a figure of a known shape and acquired by shooting the stage (13) and the original (4) from an oblique direction, and the figure;

an extraction step (203) of extracting from the input image an image of a portion corresponding to the area acquired by the area acquisition step (203);

a parameter acquisition step (203) of acquiring a parameter for correcting the image extracted by the extraction step (203) to an image of the original (4) as seen from the front; and a correction step (203) of correcting the image extracted by the extraction step (203) to the image of the original (4) as seen from the front using the parameter acquired by the parameter acquisition step (203).

To achieve the object, a recording medium, according to the third aspect of the invention, is a recording medium having recorded a program which allows a computer to execute:

an area acquisition step (203) of acquiring an area from which an image is to be extracted, based on an input image including an original (4), placed on a stage (13) including a figure of a known shape and acquired by shooting the stage (13) and the original (4) from an oblique direction, and the figure;

an extraction step (203) of extracting from the input image an image of a portion corresponding to the area acquired by the area acquisition step (203);

a parameter acquisition step (203) of acquiring a parameter for correcting the image extracted by the extraction step (203) to an image of the original (4) as seen from the front; and a correction step (203) of correcting the image extracted by the extraction step (203) to the image of the original (4) as seen from the front using the parameter acquired by the parameter acquisition step (203).

To achieve the object, a carrier wave signal, according to the fourth aspect of the invention, is a carrier wave signal superimposed with a program signal which allows a computer to execute:

an area acquisition step (203) of acquiring an area from which an image is to be extracted, based on an input image including an original (4), placed on a stage (13) including a figure of a known shape and acquired by shooting the stage (13) and the original (4) from an oblique direction, and the figure;

an extraction step (203) of extracting from the input image an image of a portion corresponding to the area acquired by the area acquisition step (203);

a parameter acquisition step (203) of acquiring a parameter for correcting the image extracted by the extraction step (203) to an image of the original (4) as seen from the front; and a correction step (203) of correcting the image extracted by the extraction step (203) to the image of the original (4) as seen from the front using the parameter acquired by the parameter acquisition step (203).

According to the invention, the imaging apparatus, the image processing method for the imaging apparatus, and the program which are suitable for correcting a distortion of an image obtained through shooting of an object like an original.

BRIEF DESCRIPTION OF THE DRAWINGS

These objects and other objects and advantages of the present invention will become more apparent upon reading of the following detailed description and the accompanying drawings in which:

FIGS. 8C and 8D illustrate a shape relationship between a figure drawn on the stage and a shot image, and FIGS. 8E and 8F illustrate a shape relationship between corner marks on the stage and a shot image;

FIG. 30 illustrates an equation to be used for generating reduced image data;

FIGS. 31A and 31B illustrate equations to be used for generating a binary image;

FIGS. 32A and 32B illustrate equations to be used for carrying out the rectangular acquisition process;

FIG. 33 illustrates an equation to be used for carrying out an image-motion detection process;

FIGS. 34A and 34B illustrate equations to be used for carrying out affine transformation;

FIGS. 35A and 35B are equations representing the relationship between input image data p and output image data P;

FIG. 36A illustrates an equation representing the relationship between the input-image x-y coordinate system and the stage U-V coordinate system, FIG. 36B illustrates an equation representing the relationship between the stage U-V coordinate system and the rotation-correction p-q coordinate system, and, FIG. 36C illustrates an equation representing the relationship between the rotation-correction p-q coordinate system and an output-image u-v coordinate system;

FIG. 37 illustrates an equation to be used for carrying out an interpolational method by the bilinear method;

FIGS. 38A, 38B, and 38C illustrate equations representing relationships of apex coordinates in the input-image x-y coordinate system and the stage U-V coordinate system;

FIGS. 39A, 39B, 39C, and 39D illustrate equations to be used for transformation from the input-image x-y coordinate system to the stage U-V coordinate system;

FIGS. 40A and 40B illustrate equations for acquiring a projection correction parameter Atp;

FIG. 41 illustrates the relationship between the input-image x-y coordinate system and the stage U-V coordinate system;

FIG. 42 illustrates an equation indicating an affine transformation parameter to be used in carrying out projection correction;

FIGS. 43A and 43B illustrate equations to be used for transformation from the stage U-V coordinate system to the rotation-correction p-q coordinate system;

FIGS. 44A, 44B, and 44C illustrate equations for acquiring a rotation correction parameter Arf; and FIGS. 45A, 45B, and 45C illustrate equations for acquiring a zoom parameter Azm.

DETAILED DESCRIPTION OF THE PREFERRED EMBODIMENT

A document camera 1 according to an embodiment of the invention will now be explained with reference to the accompanying drawings.

Figure 1:
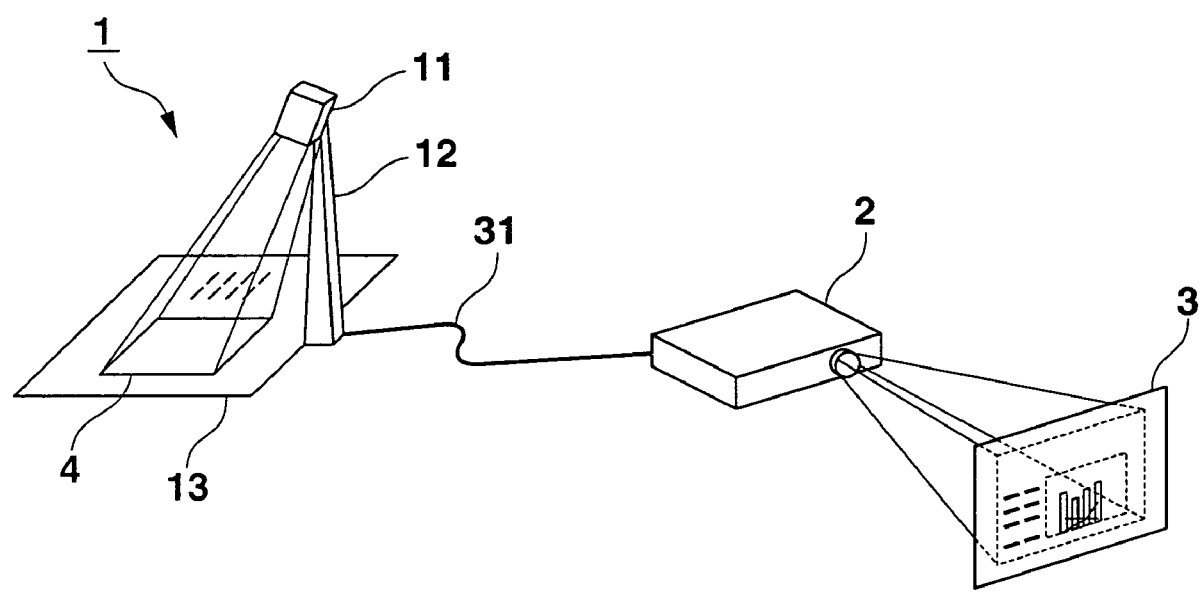
FIG. 1 is a diagram illustrating the structure of an imaging system using an imaging apparatus according to an embodiment of the invention.

FIG. 1 illustrates the structure of an imaging system using the document camera 1 of the embodiment of the invention.

The imaging system includes the document camera 1 and a projector 2. The document camera 1 and the projector 2 are connected together via a video footage cable 31.

The document camera 1 includes a camera section 11, a pole brace 12, and a stage 13. The camera section 11 includes a camera for shooting an object like an original 4. For example, a digital video camera is used as that camera The camera section 11 is mounted on the pole brace 12. The stage 13 supports the pole brace 12. The tilt angle of the pole brace 12 can be changed by the operation of a user. That is, overhead shootings and oblique shootings of the stage 13 and the original 4 are possible.

The projector 2 transforms image data, supplied from the document camera 1, into a projection light, and irradiates a screen 3 with this projection light, thereby projecting the image data including the original 4 on the screen 3.

Next, the structure of the document camera 1 will be explained.

The document camera 1 shoots a figure (for example, an oblong) whose sides have known lengths. Using image obtained by shooting the figure, and image obtained by shooting the original 4, the document camera 1 acquires a projection correction parameter Atp as will be discussed later. Using the projection correction parameter Atp, the document camera 1 performs projection correction. The projection correction will be discussed later.

Figure 2:
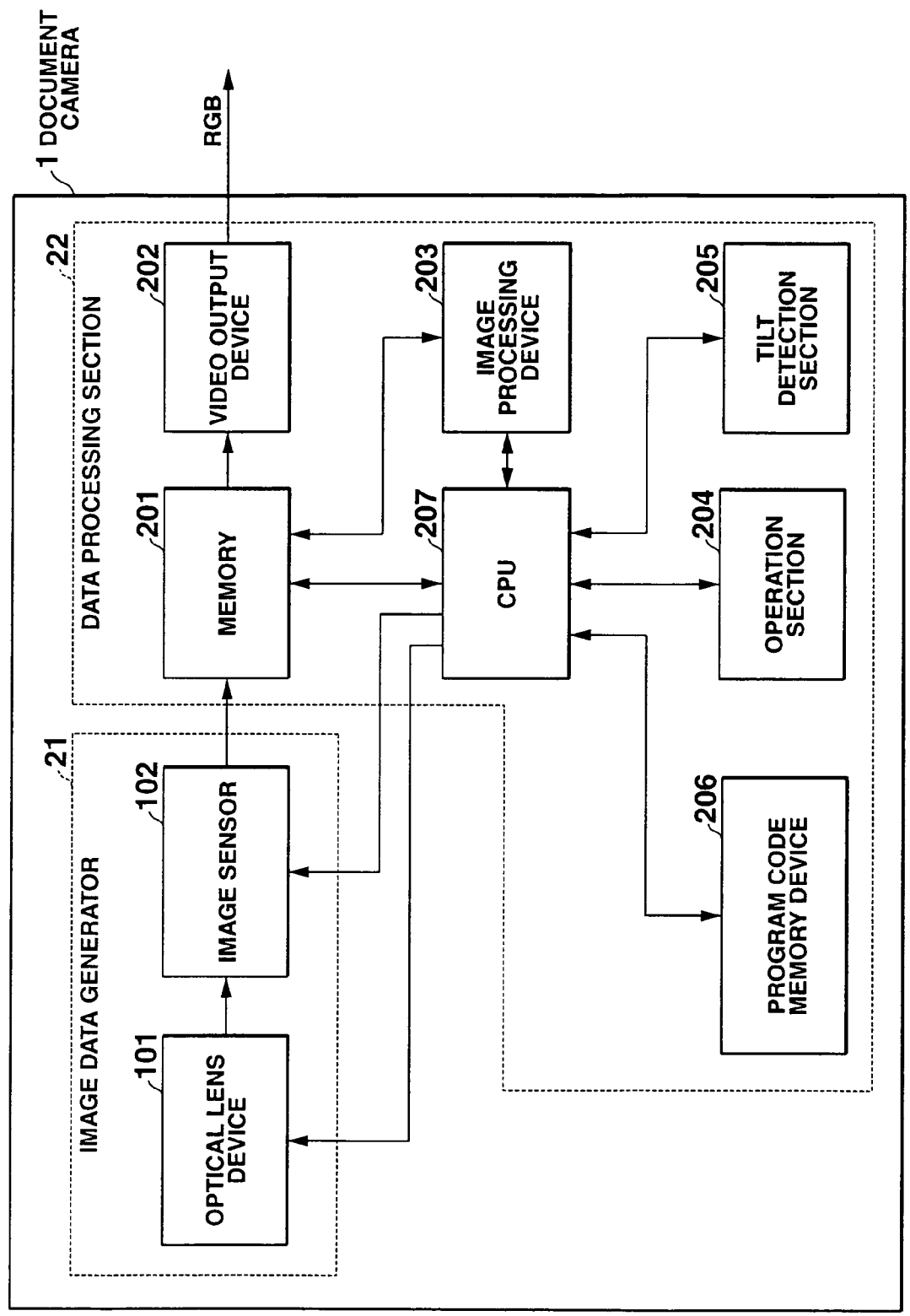
FIG. 2 is a block diagram illustrating the structure of the imaging apparatus according to the embodiment of the invention.

As shown in FIG. 2, the document camera 1 includes an image data generator 21 and a data processing section 22. The image data generator 21 captures an image obtained by shooting the original 4 and digitally transforms it, thereby acquiring input image data.

The data processing section 22 acquires the image data generated by the image data generator 21, and generates image data to be output to the projector 2.

The image data generator 21 and the data processing section 22 may be included in the camera section 11 shown in FIG. 1.

Next, the structure of the image data generator 21 will be explained.

The image data generator 21 includes an optical lens device 101 and an image sensor 102.

The optical lens device 101 comprises, for example, a lens which condenses light, and shoots the object like the original 4. The optical lens device 101 has a peripheral circuit for correcting camera setting parameters such as a focal point, exposure, and a white balance.

The image sensor 102 comprises, for example, a CCD (Charged Coupled Device), and digitalizes image, which is formed by the condensation by the optical lens device 101, thereby generating the input image data.

The image data generator 21 can carry out high-resolution image shooting and low-resolution image shooting. The low-resolution image shooting is shooting with an image resolution of, for example, approximately XGA (1024×768 dots). While the low-resolution image shooting suffers a low resolution, it can ensure shooting and image reading at a speed of, for example, 30 fps (frame/second).

For a camera with the maximum number of shooting pixels being 4,000,000 (2304×1728), the high-resolution image shooting is image shooting with 4,000,000 pixels. While the high-resolution image shooting suffers slow image reading, it can provide clearer images in comparison with the low-resolution image shooting.

The data processing section 22 comprises a memory 201, a video output device 202, an image processing section 203, an operation section 204, a tilt detection section 205, a program-code memory device 206, and a CPU 207.

Figure 3:
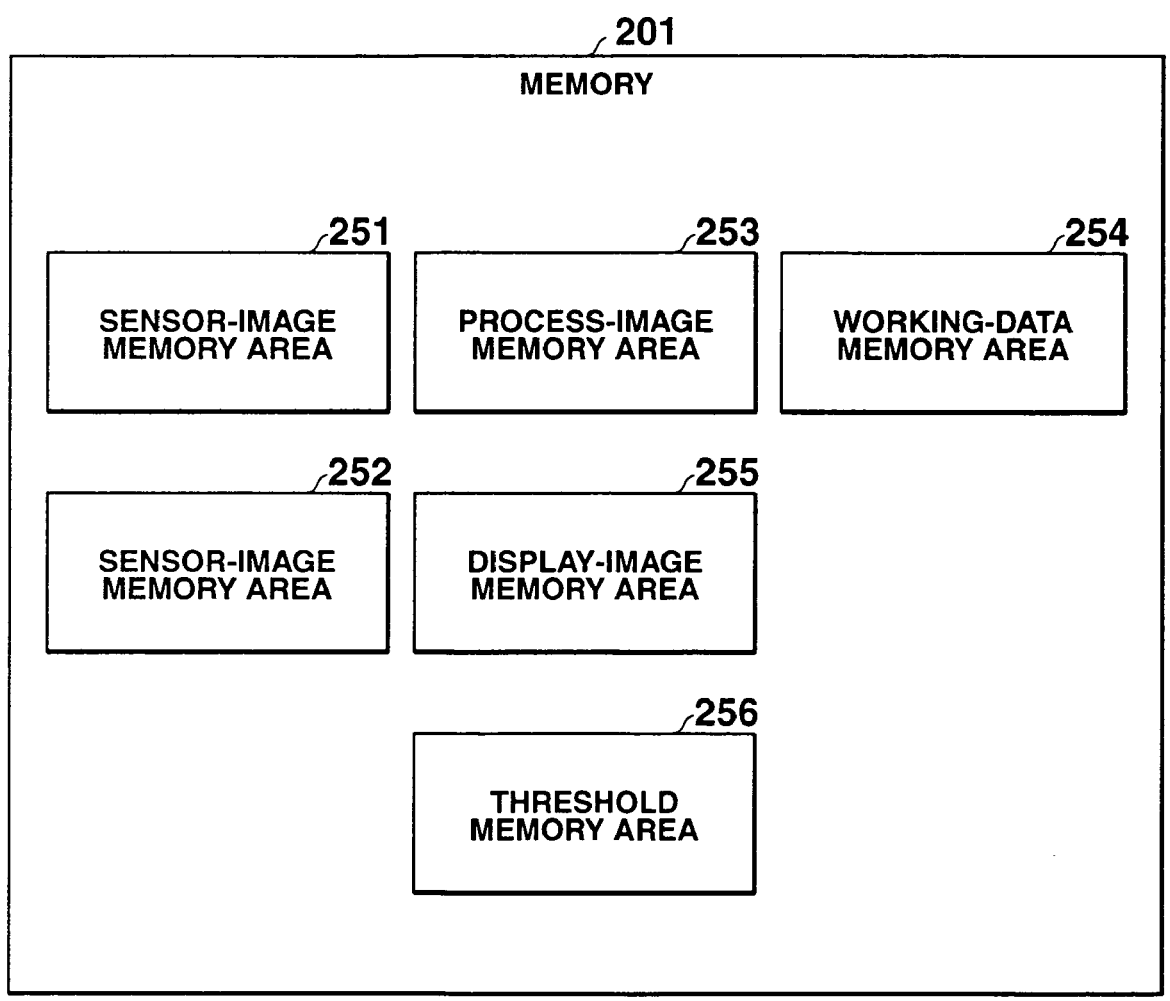
FIG. 3 is a block diagram illustrating individual storage areas in a memory.

The memory 201 stores image data, values of various kinds of flags, thresholds, etc. As shown in FIG. 3, the memory 201 includes sensor-image memory areas 251, and 252, a process-image memory area 253, a display-image memory area 254, a work-data memory area 255, and a threshold memory area 256, as areas in which those data are written.

The sensor-image memory areas 251, and 252 are areas for alternately storing image data captured by the image sensor 102, every time shooting takes place. The image sensor 102 allows the sensor-image memory areas 251, and 252, to alternately store the image data. That is, the memory 201 stores two image data, one currently captured by the image sensor 102, and the other previously captured by the image sensor 102. In reading out the image data, the image processing device 203 and the CPU 207 alternately read out the image data stored in the sensor-image memory areas 251, and 252. A process in which the CPU 207 reads out image data from the sensor-image memory area 251, and 252, will be explained in detail later.

The process-image memory area 253 in which image data is written is necessary for processes executed by the image processing device 203. The work-data memory area 255 stores coordinate data, various kinds of flags. The threshold memory area 256 stores the thresholds to be used for various determinations.

Now, return to FIG. 2, the video output device 202 generates an RGB signal based on the image data stored in the display-image memory area 254 of the memory 201. The video output device 202 outputs the generated RGB signal toward the projector 2.

The image processing device 203 performs image processing with respect to the image data stored in the sensor-image memory area 251, and 252, in accordance with an instruction from the CPU 207. Particularly, the image processing device 203 performs the following image processing to realize the functions of the document camera 1.

Monofunctional Image Processes:
(1) a reduced-image generation process
(2) a binary-edge-image generation process;
(3) a rectangular acquisition process;
(4) an image-motion detection process;
(5) an image compression process;
(6) an image conversion process.

Multifunctional Processes:
(7) an projection-correction-parameter acquisition process;
(8) rotation correction-parameter acquisition process;
(9) a motion-picture projection process;
(10) a still-picture projection process.

The processes (1) to (6) are the image processes of monofunction, and the processes (7) to (10) are the multifunctional processes with some of the image processing functions (1) to (6) combined. The processes (1) to (10) will be discussed later.

Figure 12:
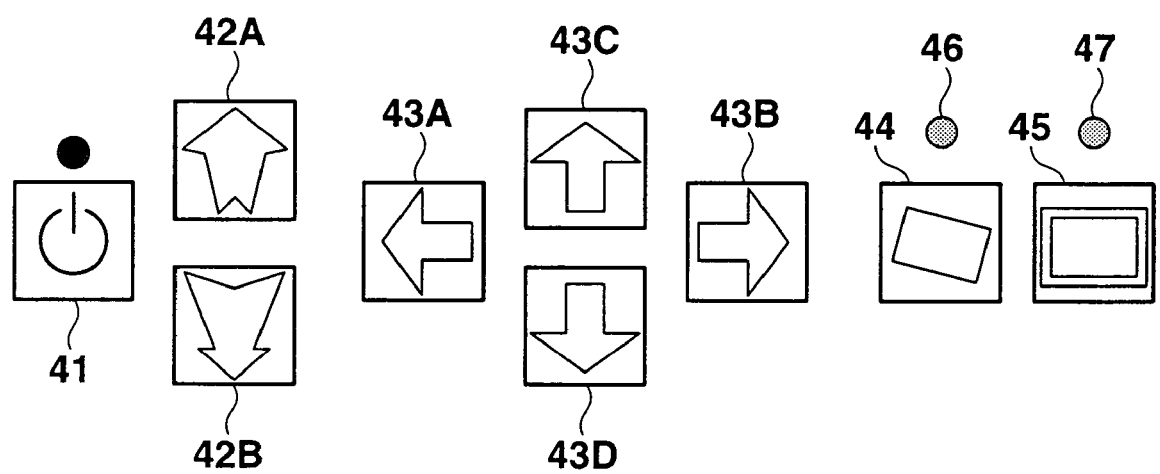
FIG. 12 is a diagram illustrating examples of each key and switch of the operation section shown in FIG. 2.

The operation section 204 acquires information entered by the user. As shown in FIG. 12, the operation section 204 has a power switch 41, a zoom-up key 42A, a zoom-down key 42B, a left-shift key 43A, a right-shift key 43B, an up-shift key 43C, a down-shift key 43D, rotation correction validate switch 44, an image fitting switch 45, and LEDs 46, and 47.

The power switch 41 is to turn the power of the document camera 1 ON and OFF.

The zoom-up key 42A and the zoom-down key 42B are the zoom control keys to control enlargement and reduction of the image projected by the projector 2. Every time the zoom-up key 42A is pressed by the user, it increases the zoom ratio Zoom by a preset magnification ratio (magnification by ZOOM_RATIO), and sends the CPU 207 a signal indicating that image data in the current magnification ratio should be enlarged. Every time the zoom-down key 42B is pressed by the user, it reduces the zoom ratio Zoom by a preset magnification ratio (magnification by 1/ZOOM_RATIO), and sends the CPU 207 a signal indicating that image data in the current magnification ratio should be reduced.

The processes which are executed by the CPU 207 when the zoom-up key 43A and the zoom-down key 43B are pressed by the user will be discussed in detail later.

The left-shift key 43A, the right-shift key 43B, the up-shift key 43C, and the down-shift key 43D are the display moving keys to instruct the shifting of the central coordinates of the displayed image during the zoomed-up display of the image data. When the user presses any of the keys 43A to 43D, each pressed key sends the CPU 207 a signal indicating that the central coordinates of the image should be shifted in the associated direction.

The rotation-correction validate switch 44 is to instruct validation or invalidation of rotation correction, and comprises, for example, a push type lock key.

The rotation correction is one of the imaging processes to be performed by the image processing device 203, and will be explained in detail later.

When pressed by the user, the rotation-correction validate switch 44 sends the CPU 207 a signal indicating that the rotation correction to be discussed later should be performed with respect to the image produced by the projector 2.

The image fitting switch 45 instructs whether or not a process of fitting the size of the image data including the clipped original 4 in that of the original 4 (hereinafter called "fitting process") is validated.

The fitting process is one of the image processes to be performed by the image processing device 203, and will be explained in detail later.

When pressed by the user, the fitting switch 45 sends the CPU 207 a signal indicating that the fitting process should be validated.

The LED 46 is provided above of the rotation-correction validate switch 44. In carrying out the rotation correction, the LED 46 is lit up in accordance with the instruction from the CPU 207, thereby notifying the user that tilt correction is validated.

The LED 47 is provided above the image fitting switch 45. In carrying out the fitting process, the LED 47 lights up in accordance with the instruction from the CPU 207, thereby notifying the user that the fitting process is validated.

The tilt detection section 205 detects the change in the tilting of the pole brace 12 when the tilt or the like of the pole brace 12 shown in FIG. 1 is changed by the user. The tilt detection section 205 includes, for example, a gravitational acceleration gauge, and detects a change in the tilting of the pole brace 12. When detecting the tilt change, the tilt detection section 205 sends the CPU 207 a signal indicating the tilt change.

The operation of the CPU 207 when the signal indicating a change in the tilting of the pole brace 12 is input in the CPU 207 will be discussed later.

The program-code memory device 206 stores the program executed by the CPU 207, and comprises, for example, a ROM (Read Only Memory).

The CPU 207 controls individual sections in accordance with the program stored in the program-code memory area 206.

Next, the process to be executed by the CPU 207 will be explained

The CPU 207 sets a parameter for controlling the peripheral circuit or the like necessary for the camera section 11 to shoot an object. For example, this parameter includes parameters for setting such as the focus of the camera section 11, the shutter speed (exposure time), exposure like an aperture, a white balance, and ISO sensitivity. The CPU 207 performs an auto focus measurement a photometry, etc., searches for the best condition for shooting the object, and controls the image data generator 21 to set those parameters.

The CPU 207 also performs, for example, the initialization of the memory 201, the initialization of data to be used for the communication, the image processing, and the like, the process of setting various parameters to allow the image processing device 203 to carry out the image processing, and the process of setting the shooting mode.

As the operable shooting modes of the document camera 1 of the embodiment there are a motion picture mode and still picture mode. In motion picture mode, the CPU 207 allows the image data generator 21 to shoot an object at a low resolution. Because the quantity of image processing by the image processing device 203, and that of the image data displayed by the projector 2 are less than those in still picture mode, the motion picture mode is suitable for a case where the object moves a lot. In contrast, the still picture mode allows the image data generator 21 to shoot an object at a high resolution. Because the amount of the image processing by the image processing device 203 and that of the image data displayed by the projector 2 are larger than those in the motion picture mode, the still picture mode is suitable for a case where the object moves little. The CPU 207 stores information indicating the set shooting mode in the work-data memory area 255 of the memory 201.

In the embodiment, when the motion of the object is detected and notified to the CPU 207 by the image-motion detection process of the image processing device 203, the CPU 207 sets the shooting mode to the motion picture mode. When no motion of the object is detected and notified to the CPU 207 by the image processing device 203, the CPU 207 sets the shooting mode to the still picture mode.

The shooting mode may be set in accordance with an instruction from the user. In this case, for example, the operation section 204 may further have a button or the like to set the motion picture mode or the still picture mode. This button may be so structured as to send the CPU 207 a signal indicating that shooting should be performed in the associated shooting mode, when pressed by the user, and, the CPU 207 may be so structured as to set the shooting mode.

First, when the document camera 1 is powered on, the CPU 207 initializes various parameters for controlling the operations of the image data generator 21 and the image processing device 203. The CPU 207 controls the image data generator 21 to shoot an object at a low resolution. The CPU 207 controls the image sensor 102 and the memory 201 in such a way that the data captured by the image sensor 102 are alternatively stored in the sensor-image memory areas 251, and 252.

For example, when the image sensor 102 acquires image data D1 at a certain time T1, the CPU 207 allows the image sensor 102 to store the image data D1 in the sensor-image memory area 251 (or the sensor-image memory area 252). When the image sensor 102 shoots the object and acquires image data D2 at the next time T2, the CPU 207 allows the image sensor 102 to store the image data D2 in the sensor-image memory area 252 (or the sensor-image memory area 251). Further, when the image sensor 102 shoots the object and acquires image data D3 at the next time T3, the CPU 207 allows the image sensor 102 to store the image data D3 in the sensor-image memory area 251 (or the sensor-image memory area 252) in an overwriting manner.

The CPU 207 alternatively reads out the image data from the sensor-image memory areas 251, and 252, writes the data in the process-image memory area 253, and allows the image processing device 203 to execute the image-motion detection process to be discussed later. The image processing device 203 performs the image-motion detection process, and sets data to a flag of Motion_Control_Flag, representing the result of the image-motion detection process. For example, when having determined that there is a motion of an image, the image processing device 203 sets the flag of Motion_Control_Flag to "1", and when having determined that there is no motion of the image, the image processing device 203 sets that flag to "0".

The image-motion detection process is one of the image processes which are to be executed by the image processing device 203, and will be explained in detail later.

The CPU 207 refers to the flag of Motion_Control_Flag, stored in the work-data memory area 255 of the memory 201 and representing the result of the image-motion detection process, and determines whether or not the object in the shooting range has moved.

When having determined that the object in the shooting range has moved, the CPU 207 sets the shooting mode to the motion picture mode, and allows the image processing device 203 to execute the motion-picture projection process to be discussed later.

In contrast, when having determined that the object in the shooting range is at rest, the CPU 207 allows the image processing device 203 to execute the processes such as the projection correction and the rotation correction as will be discussed later.

When notified by the tilt detection section 205 that the tilting of the pole brace 12 is changed, the CPU 207 sets a value indicating that the projection correction should be performed to a flag of Projection_control_Flag which requests the projection-correction-parameter acquisition process. The CPU 207 stores that flag of Projection_control_Flag in the work-data memory area 255 of the memory 201. For example, when carrying out the projection correction, the CPU 207 sets the flag of Projection_control_Flag to "1", and, when carrying out no projection correction, the CPU 207 sets that flag to "0". When detecting that the flag of Projection_contorol_Flag is set, the image processing device 203 executes the projection-correction-parameter acquisition process (7) to be discussed later. When terminating the projection-correction-parameter acquisition process (7), the image processing device 203 notifies the CPU 207 of the termination of that process. The image processing device 203 sets data to a flag of Projection_Result_Flag which indicates whether or not the projection parameter is acquired. For example, when the projection correction parameter is acquired normally, the image processing section 203 sets "1" to the flag, and, when that parameter is not acquired, the image processing section 203 sets "0" to the flag.

The projection-correction-parameter acquisition process is one of the image processes to be executed by the image processing device 203, and will be explained in detail later.

The CPU 207 refers to the value of the flag of Projection_Result_Flag, stored in the work-data memory area 255 of the memory 201, and indicating whether or not the projection correction parameter is acquired. When the data which indicates that the projection correction parameter is set, the CPU 207 resets the flag of Projection_Control_Flag for requesting the projection-correction-parameter acquisition process, and stores it in the work data memory area 255 of the memory 201.

In contrast, when data indicating that the projection correction parameter Atp has not been acquired is set the CPU 207 notifies the user that the image process cannot be performed for the shot image. For example, the CPU 207 notifies the user by lightening up the LEDs 46, and 47 in a predetermined lighting pattern. Alternatively, the CPU 207 may notify the user by a predetermined audio sound. In this case, the document camera 1 may further have an audio output device including a D/A converter which converts a predetermined audio signal into an analog signal, a speaker, etc. The CPU 207 may allow the audio output device to reproduce predetermined audio data indicating that image processing is not possible.

When the user presses various operation keys of the operation section 204, the CPU 207 receives signals instructing the operations associated with the pressed keys from the operation section 204.

That is, when the rotation-correction validate switch 44 is pressed, the CPU 207 sets data indicating that the execution of rotation correction to rotation correction-control flag of Rotate_Control_Flag to allow the image processing device 203 to execute the rotation correction to be discussed later. The CPU 207 stores the value of that flag in the work-data memory area 255 of the memory 201.

The rotation correction is one of the image processes to be executed by the image processing device 203, and will be explained in detail later.

When the image fitting switch 45 is pressed, the CPU 207 sets data indicating the execution of a clipping process to a flag of Fitting_Control_Flag for controlling the clipping process, to fit the size of clipped image data to that of output image data. The CPU 207 stores the value of that flag in the work-data memory area 255 of the memory 201.

The fitting process is one of the image processes to be executed by the image processing device 203, and will be explained in detail later.

Next, the image process executed by the image processing device 203 will be explained. As mentioned above, the image processing device 203 executes (1) the reduced-image generation process, (2) the bin-edge-image generation process, (3) the rectangular acquisition process, (4) the image-motion detection process, (5) the image compression process, (6) the image conversion process, (7) the projection-correction-parameter acquisition process, (8) the rotation-correction-parameter acquisition process, (9) the motion-picture projection process, and (10) the still-picture projection process. Each process will be explained below in detail.

(1. Reduced-image Generation Process)

The reduced-image generation process averages pixel values of some neighboring pixels input data to acquire the pixels of a reduced image, thereby generating the reduced image with the reduced pixel quantity. This process is executed in the image-motion detection process, the projection-parameter acquisition process, and the rotation-correction-parameter acquisition process to be discussed later.

The image processing device 203 averages pixel values of some neighboring pixels in an image p, thereby generating a reduced image q with the reduced pixel quantity.

Suppose that the size of an original image is (Xbmax× Ybmax) pixels, and the size of the reduced image is (Xsmax× Ysmax) pixels. In this case, a pixel value q(m,n) ($1 \leq m \leq Xsmax$, $1 \leq n \leq Ysmax$), corresponding to the coordinates (m,n) of the reduced image q, is acquired from the average of nine neighboring points around a pixel value p (x,y) corresponding to the coordinates (x,y) of the image p, using the equation shown in FIG. 30.

For example, if the image size of the image p is XGA (1024×768 pixels), and the image size of the reduced image q is 170,000 pixels (480×360 pixels), it is approved that Xbmax=1024, Ybmax=768, Xsmax=480, and Ysmax=360.

(2. Edge-image Generation Process)

Figure 4A:
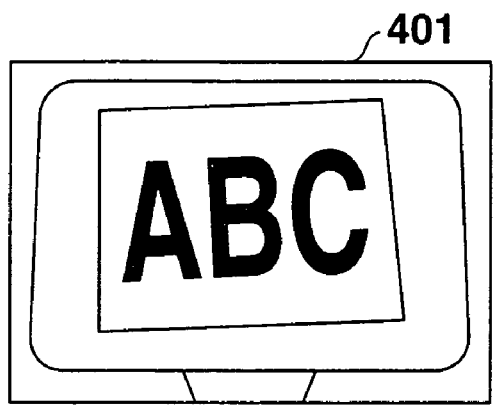
FIGS. 4A, 4B, 4C, and 4D are diagrams for explaining a creation process of a binarized edge image and a rectangular acquisition process both executed by image processing device, and, FIGS. 4A, 4B, 4C, and 4D respectively illustrate an input image, a binarized edge image which does not undergone a masking process, a masking image, and a masking process undergone the binarized edge image.
Figure 4B:
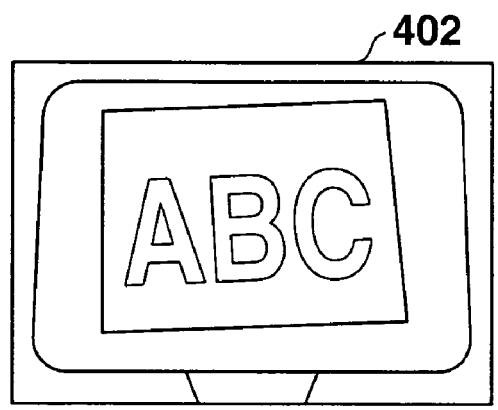

The edge-image generation process detects edges from the generated reduced image, and generates an image represented by the outlines of the reduced image. For example, if an input image is the image shown in FIG. 4A, the image processing device 203 executes the edge-image generation process, thereby generating an edge image 402 shown in FIG. 4B. This process is executed in the projection-correction-parameter acquisition process, and the rectangular acquisition process.

To generate the edge image 402, a filter for detecting an edge, which is called Roberts filter, is used. The Roberts filter detects the edge of an image by weighting two groups of four neighboring pixels to acquire two filters, and averaging them.

If the Roberts filter is used for a pixel value f(x,y) possessed by a pixel at coordinates (x,y) on an x-y plane, the pixel value g (x,y) transformed by that filter is expressed by the equations shown in FIGS. 31A and 31B.

The image processing device 203 binarizes the edge image 402 obtained in such a way. For example, the image processing device 203 determines whether or not the pixel value g(x,y) is larger than a preset threshold g_th, thereby binarizing the edge image 402.

The threshold g_th may be a fixed value, or a variable acquired by a method like a variable threshold method. The threshold g_th is prestored in the threshold memory area 256 of the memory 201. Using the equations shown in FIGS. 32A and 32B, the image processing device 203 computes a pixel value h(x,y) with respect to a point at coordinates (x,y) on the edge image from the pixel value g(x,y) of the edge image 402, obtained from the equations in FIGS. 31A and 31B.

(3. Rectangular Acquisition Process)

The rectangular acquisition process acquires a rectangular shape included in a shot image. This process is executed in the rotation-correction-parameter acquisition process, and acquires the rectangular shape represented by the outline of image data including the original 4.

Figure 4C:
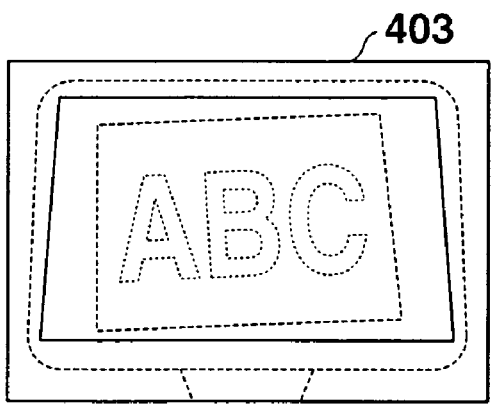

If the execution of a masking is designated, the image processing device 203 executes a masking process using a masking image 403 shown in FIG. 4C. The image processing device 203 generates the masking image 403 in the projection-correction-parameter acquisition process to be discussed later.

Figure 4D:
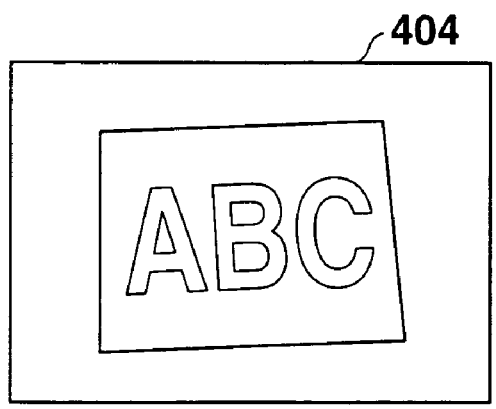

In executing the masking process, the image processing device 203 executes an AND operation on image data, obtained by the generation of the binarized edge image, and the masking image 403, and clips an original image in a masking area. The image processing device 203 acquires image data 404, undergone the masking process, shown in FIG. 4D.

In contrast, if the execution of masking is not designated, the image processing device 203 acquires the rectangular shape without executing masking.

To acquire the rectangular shape, the image processing device 203 executes the Hough transform for the edge image 402 generated by the edge-image generation process to detect the straight lines representing the outline of the original 4.

Figure 5A:
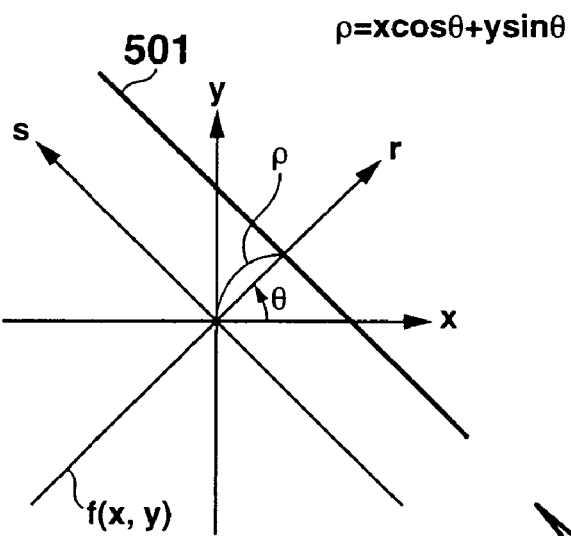
FIGS. 5A and 5B are diagrams for explaining the Hough transform.
Figure 5B:
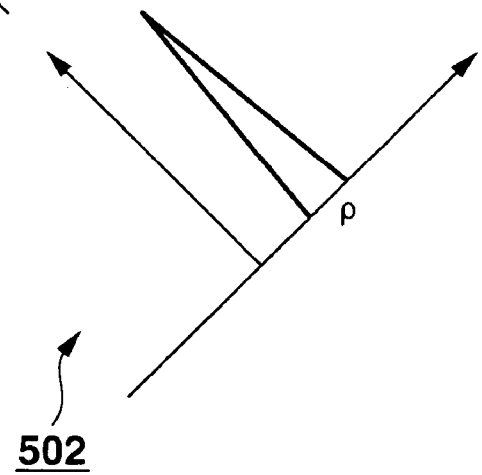

The Hough transform is the technique that transforms the coordinates of a point constituting a straight line 501 on the x-y plane shown in FIG. 5A, with the equation shown in FIG. 32A, votes it on the ρ-θ plane (Hough plane) shown in FIG. 5B, thereby transforming it into a vote number ρ on the ρ-θ plane.

To be more precise, an angle θ is changed within the range of $0° \leq θ < 180°$ to scan the edge image 402. A pixel (x,y) that an edge is detected is substituted into the equation 4, the vote value for each angle θ is computed, and voted in a point (ρ,θ) on the Hough plane. The reason why the angle θ varies from 0° to 180° is that all straight lines are detectable within this range. That is, the vote numbers ρ between $180° \leq θ < 360°$ are equal to the negative vote numbers ρ between $0° \leq θ < 180°$.

When the Hough transform is executed for each point (x,y) on the same straight line within the range from 0° to 180°, the straight line is transformed into one point on the ρ-θ plane (Hough plane). That is, The point (ρ,θ) on the ρ-θ plane (Hough plane) represents the straight line. The vote number ρ is to be the number of the pixels on the straight line on the x-y plane. That is, the vote number ρ corresponds to the length of the straight line. A point on the ρ-θ plane with a less vote number ρ in comparison with others represents a short straight line. In this case, the image processing device 203 can exclude that point from a candidate to be assumed as a straight line representing the edge of the original 4.

For example, if the original 4 formed in a quadrangular shape is placed on the stage 13, and to be shot by the document camera 1, there are four straight lines represented by the four sides of the outline of the original 4 in image data generated by the image data generator 21. In this case, with the respective sides of the quadrangular original 4 being the top side, the bottom side, the right side, and the left side, the points on the top side and the bottom side are transformed in the neighborhood of the angle θ=90° on the ρ-θ plane. The points on the right side and the left side are transformed in the neighborhood of the angle θ=180°. Accordingly, it is preferable that the ρ-θ plane (Hough plane) should be generated within the ranges of $60° \leq θ < 120°$, and $150° \leq θ < 210°$, rather than the range of $0° \leq θ < 180°$.

It is possible to specify the up or down side, or the right or left side according to the positive or negative value of the vote number ρ. That is, the top, bottom, right, and left sides of the original 4 lie at locations on the ρ-θ plane (Hough plane) represented by the equation shown in FIG. 32B.

Therefore, if the physical center of the quadrangular original 4 is located around the center of an image shot by the document camera 1, the location of individual sides representing the outline of the original 4 can be efficiently obtained by the computation of the vote number ρ within the range indicated by the equation of FIG. 32B.

Based on the preset threshold for the vote number ρ, the image processing device 203 searches for the coordinates (σ,θ) within the range of each sides represented by the equation of FIG. 32B with the vote number larger than the threshold, and generates a list of the candidates of individual sides. The image processing device 203 computes the coordinates of a point at which the absolute value of the vote number p becomes the maximum, from those candidates. The image processing device 203 assumes the straight line on the x-y plane indicated by the computed point on the ρ-θ plane, as a straight line portion corresponding to the outline portion of the original 4.

As mentioned above, the image processing device 203 computes the point on the ρ-θ plane representing the straight line of the outline portion of the original 4, and generates information representing the outline portion of the original 4. Accordingly, the image processing device 203 can acquire an image area to undergo image processing, such as the projection correction and the rotation correction, to be discussed later.

The image processing device 203 can also generate information representing the outline portion of the stage 13, as done in the case of the original 4. That is, as will be discussed later, the image processing device 203 can acquire an image area to undergo image processing, based on the result from the recognition of the outline portion of the stage 13. In this case, information relating to the shape of the stage 13 is prestored in the memory 201. The image processing device 203 may read out that information from the memory 201, and acquire the image area to undergo image processing based on that information.

Further, the image processing device 203 can acquire the image area to undergo image processing based on the result from the recognition of a figure drawn on the surface of the stage 13 beforehand. In this case, the memory 201 prestores information relating to the shape and the location of the figure drawn on the stage 13. The information processing device 203 may read out that information from the memory 201, and acquire the image area to undergo image processing based on that information and the result from the recognition of the figure on the stage 13. Alternatively, a characteristic object whose shape is known beforehand may be placed on the surface of the stage 13, and the memory 201 prestores information relating to the shape and the location of the characteristic object.

(4. Image-motion Detection Process)

The image-motion detection process detects the motion of the object like the shot original 4. The image processing device 203 executes this detection of the motion based on an image change MD. The image change MD is an amount representing how much a newly shot image changes from the previous one by comparing the newly shot image with the previously shot image. The image processing device 203 computes the image change MD based on the equations shown in FIGS. 34A and 34B.

If the image changes MD are computed for all pixels constituting image data obtained by shooting the original 4 or the like, the amount of computation for the image-motion detection process becomes large. Accordingly, predetermined pixels for computing the image changes MD may be appointed beforehand from all the pixels, and the image processing device 203 may computes the image changes MD for the predetermined pixels.

To detect the motion of the object like the original 4, the image processing device 203 compares the image change MD with the preset threshold MD_th. If the image change MD is greater than the threshold MD_th, the image processing device 203 determines that the object has moved, and, if the image change MD is less than or equal to that threshold, the image processing device 203 determines that the object is at rest. The threshold MD_th is prestored in the threshold memory area 256 of the memory 201.

When the user replaces the original 4 or the like on the stage 13, for example, image data generated by the image data generator 21 changes, thus increasing the image change MD. If the image change MD is greater than the threshold MD_th, the image processing device 203 detects that the shot object has moved.

In contrast, when the user finishes replacing the original 4 on the stage 13, for example, the value of the image change MD becomes smaller than that in the case where the original 4 or the like is being replaced. If the image change MD becomes less than or equal to the threshold MD_th, the image processing device 203 detects that the shot object is at rest.

Based on the result from the motion detection, the image processing device 203 sets or resets the value of the flag of Motion_Control_Flag representing that result. That is, if the image change MD is greater than the threshold MD_th, the image processing device 203 sets the value representing that the object has moved, to the flag of Motion_Control_Flag. If the object has moved, for example, the image processing device 203 sets the value "1" to the flag of Motion_Control_Flag.

In contrast, if the image change MD is less than or equal to the threshold MD_th, the image processing device 203 sets the value, representing that the object is at rest, to the flag of Motion_Control_Flag. For example, if the object is at rest, the image processing device 203 sets "0" to the flag of Motion_Control_Flag.

The image processing device 203 stores the value, which is set to the flag of Motion_Control_Flag representing the result of the motion detection, in the working data memory area 255 of the memory 201.

(5. Image Compression Process)

The image compression process compresses image data to be sent to the projector 2 to reduce the data size of that image data.

The image processing device 203 compresses the image data stored in the display image memory area 254 of the memory 201 in JPEG (Joint Photographic Experts Group) format. The image processing device 203 writes the compressed image data in the display image memory area 254 of the memory 201. The format of image data to be used in image compression is not limited to JPEG, other compression formats may be used.

(6. Image Conversion Process)

The image conversion process extracts image data on a predetermined portion from image data generated by the image data generator 21 and including the original 4 on the stage 13, and performs the projection correction, the rotation correction, and the zoom process on the extracted image data. The image processing device 203 extracts the portion of the image data corresponding to the original 4 from the image data, based on the information acquired by the rectangular acquisition process and representing the outline of the original 4. In general, an image extracted out without the projection correction or the like is distorted.

The image processing device 203 performs the image conversion on the extracted data using the projection correction parameter, the rotation correction parameter, and the zoom parameter which are obtained by the respective steps to be discussed later.

The projection-correction process performs the projection transformation on the extracted image data, thereby correcting the distortion of the extracted image data. To correct the distortion, the image processing device 203 uses the affine transformation which is widely adapted for the spatial transformation of image data. In the embodiment, the affine transformation is used for the rotation correction, the image zoom process to the image data generated by the image data generator 21 and including the original 4.

The image processing device 203 extracts an affine parameter At which represents the relationship of the affine transformation between the original image data, as the extracted image data, and the projection-corrected image data Using the transformation parameter At, the image processing device 203 acquires the pixel point p(x,y) of the original image associated with each pixel P(u,v) of the projection-corrected image.

Next, an explanation will be given of the affine transformation.

The affine transformation is widely used for the spatial transformation of an image. In the embodiment, the projection transformation is performed by using the two-dimensional affine transformation. A point at the coordinates (u,v) before the transformation is to be a point at the coordinates (x,y) by the transformations such as the shifting, the zooming, and the rotation.

In carrying out the projection transformation for the original image data using the affine transformation, for example, the relationship between the original coordinates (u,v) before the transformation and the coordinates (x,y) undergone transformation can be expressed by the equations shown in FIGS. 34A and 34B. According to the equations, the values of the x and y of the transformed coordinates converge toward zero if the value of z' becomes large. That is, parameters included in z' affects the projection transformation. The parameters are $a_{13}$, $a_{23}$, and $a_{33}$. Because the parameters $a_{13}$ and $a_{23}$ can be normalized by the parameter $a_{33}$, $a_{33}$ may be set to "1".

Using the affine transformation, the image processing device 203 of the embodiment associates image data p, generated by the image data generator 21, with image data P output by the data processing section 22. Hereinafter, the image data p generated by the image generator 21 is called "input image data", while the image data P output by the data processing section 22 is called "output image data".

In acquiring the output image data P from the input image data p, it is desirable to acquire the pixel location of the input image data p corresponding to that of the output image data P, not the pixel location of the output image data P corresponding to that of the input image data p.

To associate the input image p with the output image P, the image processing device 203 of the embodiment uses the following three affine transformations. Those transformations will be explained with reference to FIGS. 6A to 6D.

Figure 6A:
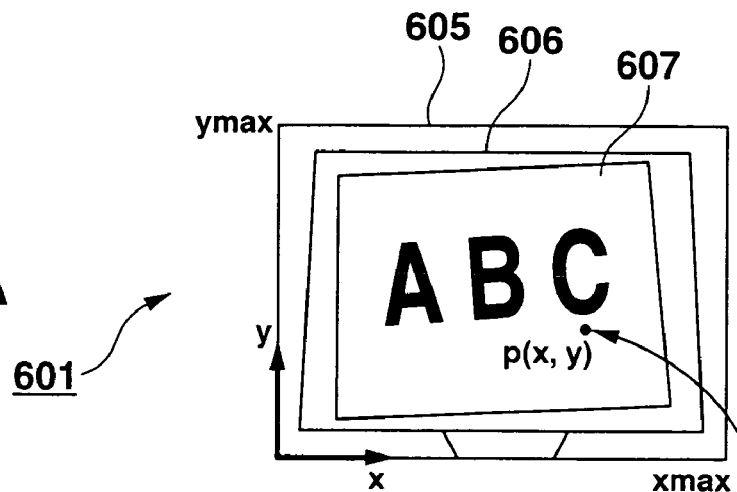
FIGS. 6A, 6B, 6C, and 6D are explanatory diagrams of the relationship among individual coordinate systems until acquiring an output image data by correcting an input data, and, FIGS, 6A, 6B, 6C, and 6D respectively illustrate an input-image x-y coordinate system, a stage U-V coordinate system, rotation correction p-q coordinate system, and an output-image u-v coordinate system.

As shown in FIG. 6A, the coordinate system of input image data 605 is called "input image x-y coordinate system" 601. As shown in this figure, the input image data 605 includes an image 606 corresponding to the stage 13, and an image 607 corresponding to the original 4. The pixel value of the input image data 605 at the coordinates (x,y) is expressed as p(x,y). The size of the input image data 605 is to be as $0 \leq x < x$ max, and $0 \leq y < y$ max.

Figure 6B:
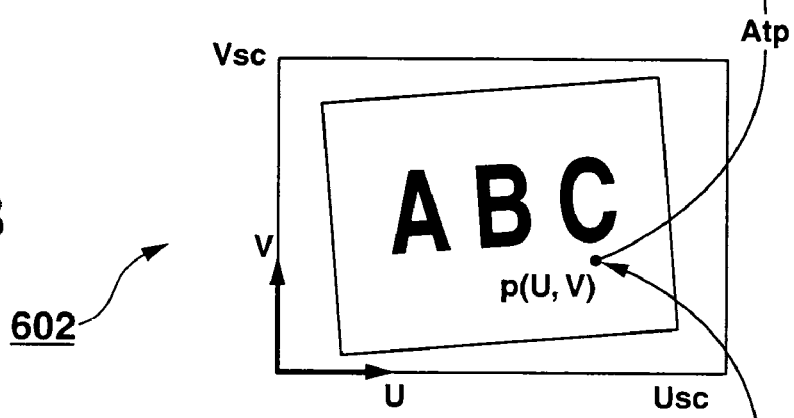

The image processing device 203 corrects the pixel value p(x,y) at the coordinates (x,y) into a "stage U-V coordinate system" 602 shown in FIG. 6B to compute the pixel value p(U,V) of the corrected image data. That is, the stage U-V coordinate system 602 is a coordinate system with respect to the image data, clipped along eth outline of the stage 13 by the above-described rectangular acquisition process, from the image data generated by the image data processor 21 and including the original 4. The size of an image on the stage U-V coordinate system 602 is to be as $0 \leq U < Usc$, and $0 \leq V < Vsc$. The projection correction parameter for performing the projection correction on the pixel value p(x,y) of the input image data 605 to the pixel value p(U,V) of the image data on the stage U-V coordinate system 602, is expressed as Atp.

Next, the image processing device 203 performs the rotation correction on the image data on the stage U-V coordinate system 602. The image processing device 203 computes the pixel value p(p,q) of the image data undergone rotation correction. The coordinate system shown in FIG. 6C and expressing the pixel value p(p,q) of the image data undergone rotation correction is called "rotation-correction p-q coordinate system" 603. The rotation correction parameter is expressed as Arf.

Figure 6C:
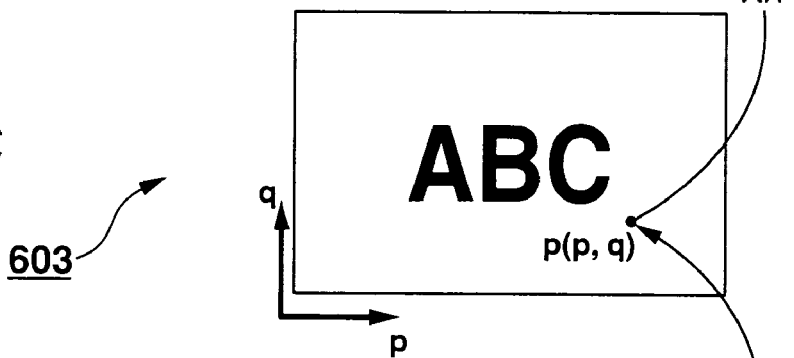
Figure 6D:
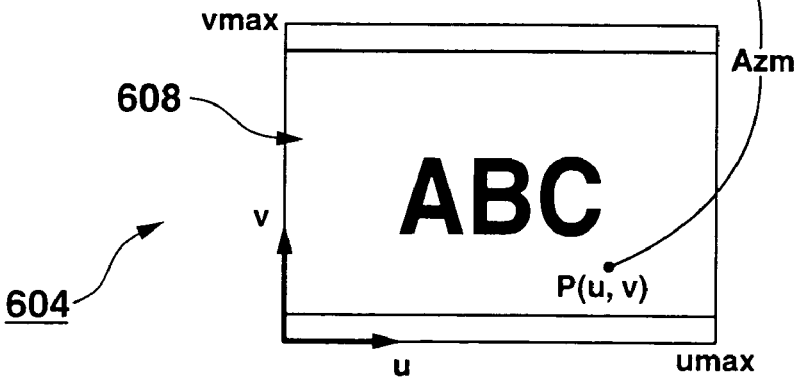

Next, the image processing device 203 enlarges the entire or a part of the pixel value p(p,q) of the image data shown in FIG. 6C, and executes the zoom process of fitting the size of the image to the output size of the projector 2, thereby generating image data P(u,v). The coordinate system shown in FIG. 6D and expressing the pixel value P(u,v) of the output image data 605 is called "output image u-v coordinate system" 604. The size of the image data on the output image u-v coordinate system 604 is to be as $0 \leq u < u$ max, and $0 \leq v < v$ max. The zoom parameter for carrying out such a zoom process is expressed as Azm.

As mentioned, the image processing device 203 performs three transformations of the projection correction, the rotation correction, and the zooming to the pixel value p(x,y) of the input image data 605, thereby obtaining the pixel value P(u,v) of corrected output image data 608. That is, by the projection correction parameter Atp, the rotation correction parameter Arf, and the zoom parameter Azm, the input image data p(x,y) and the output image data P(u,v) are expressed by the equations shown in FIGS. 35A and 35B.

The relationships between the coordinate systems shown in FIGS. 6A to 6D respectively are expressed by the equations shown in FIGS. 36A, 36B, and 36C.

Accordingly, to execute such an image conversion process, the image processing parameter 203 needs the following three parameters.

(a) affine transformation parameter At (b) parameters (x max, y max) for acquiring the sizes of the sensor-image memory areas 251, and 252 for storing the input image data p(x,y)

(c) parameters (u min, u max, v min, v max) for acquiring the size of the display-image memory area 254 for storing the output image data P(u,v)

When those parameters (a) to (c) are input from the CPU 207, the image processing device 203 computes the pixel value P(u,v) of the input image data for each pixel.

First, the image processing device 203 computes the coordinates of the input image data 605 corresponding to the coordinates (u,v) of the output image data 608, in accordance with the equation shown in FIG. 34B.

However, it is not always true that each value of the coordinates (x,y) of the input image data 605 is to be an integer. Accordingly, using an interpolational method by a bilinear method, the image processing device 203 acquires the pixel value P(u,v) of the output image data 608 at the coordinates (u,v) from the pixel value around the coordinates (x,y) of the input image data 605.

The interpolational method by the bilinear method can be expressed by the equation shown in FIG. 37. The image processing device 203 computes the pixel values P(u,v) for all coordinate points within the output range, in accordance with that equation.

(7. Projection-correction-parameter Acquisition Process)

The projection-correction-parameter acquisition process acquires the relationship between the input image data 605, and the image clipped along the outline of the stage 13. To be more precise, this process computes the projection correction parameter Atp expressed by the equation shown in FIG. 36A.

Figure 7:
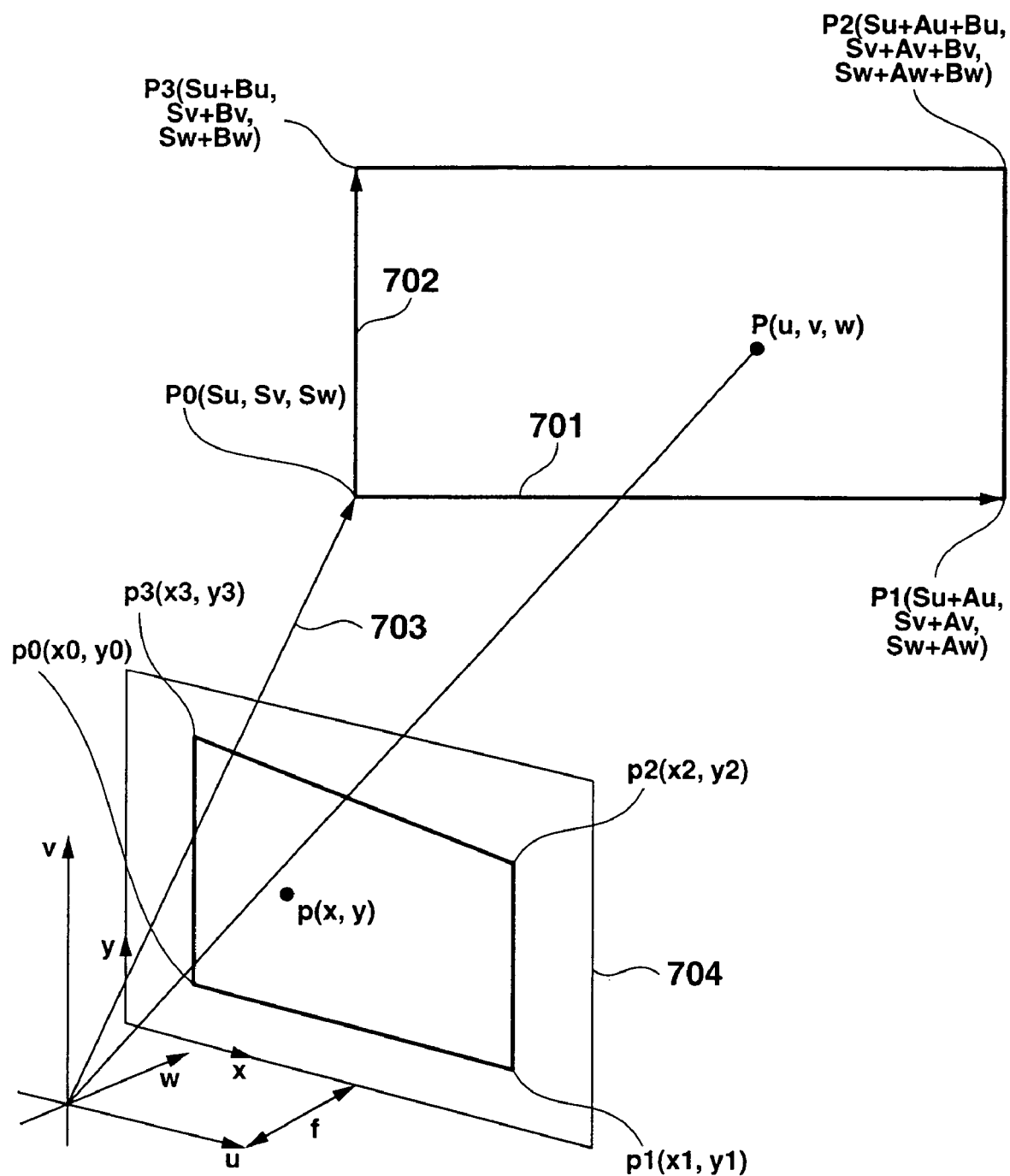
FIG. 7 is a diagram for explaining an acquisition process of projection correction parameter using affine transformation.

First, an explanation will be given of the relationship of the image data before and undergone projection transformation with the projection correction parameter Atp, referring to FIG. 7.

This figure is for explaining the relationship between a square on the shot image and the actual image of the original 4 when the square (oblong) original 4 is shot by the camera section 11. The coordinates of each apex are shown in this figure.

A U-V-W coordinate system is a three dimensional coordinate system for the image obtained by shooting with the camera section 11. A first vector (Au, Av, Aw) 701 and a second vector (Bu, Bv, Bw) 702 are vectors which represent the original 4 on the U-V-W coordinate system. A third vector (Su, Sv, Sw) 703 is a vector which links the origin of the U-V-W coordinate system and the location of the camera section 11.

A virtual screen 704 shown in this figure is for virtually projecting the image shot by the document camera 1, and for performing the projection correction on the image data displayed on the virtual screen 704. With the coordinate system of the point on the virtual screen 704 being (x,y), the image data projected on the virtual screen 704 may be the image data obtained by shooting the document camera 1.

It is assumed that the virtual screen 704 be vertically located apart from the origin of a W axis by a distance. An arbitrary point P(u, v, w) on the stage 13 and the origin are linked together by a straight line, and the coordinates of the intersection of that straight line with the virtual screen 704 is taken as p(x,y). At this time, the coordinates of the intersection of the virtual screen 704 can be expressed by the projection transformation by the equation shown in FIG. 38A.

Accordingly, the respective relationships between the four points P0, P1, P2, P3 of the stage 13 undergone projection transformation and the projection points p0, p1, p2, p3 on the virtual screen 704 before the projection transformation can be expressed by the equation shown in FIG. 38B.

At this time, the projection coefficients $\alpha$ and $\beta$ can be expressed by the equation shown in FIG. 38C.

Next, an explanation will be given of the projection transformation. An arbitrary point P on the stage 13 can be expressed by the equation shown in FIG. 39A with the first vector 701, the second vector 702, and the third vector 703.

In substituting the relational expression shown in FIG. 38B into that equation, the coordinates x and y can be expressed by the equation shown in FIG. 39B.

In applying that relationship to the equations as the equations for the affine transformation, shown in FIGS. 34A and 34B, the equation in FIG. 39B can be the equation in FIG. 39C.

This m, n coordinate system is applied to the stage U-V coordinate system shown in FIG. 6B. With the size of the stage 13 on the stage U-V coordinate system 602 being Usc and Vsc, m and n can be expressed by the equation shown in FIG. 39D.

Accordingly, the equation of FIG. 39C is written as the equation of FIG. 40A.

From this equation, the projection correction parameter Atp is expressed by the equation shown in FIG. 40B.

Using that equation, the image processing device 203 acquires the projection correction parameter Atp.

That is, to carry out the projection correction, first, the document camera 1 shoots an oblong object (for example, the stage 13) that the length of each side is already known. Next, the image data generator 21 generates original image data 801 based on the image shot by the document camera 1. The image processing device 203 of the data processing section 22 acquires image data representing the outline of the known oblong object. The image processing device 203 performs the above-described computation, thereby computing the projection correction parameter Atp. Accordingly, the image processing device 203 can execute the projection correction without being affected by the warp or the like of the original 4.

Figure 8A:
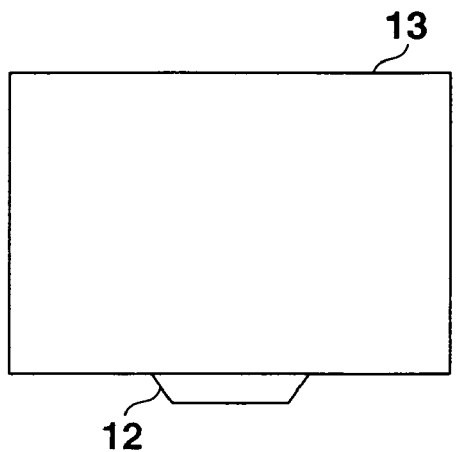
FIGS. 8A, 8B, 8C, 8D, 8E, and 8F are diagrams for explaining a shape relationship between an oblong object and an image obtained by shooting, and, FIGS. 8A and 8B illustrate a shape relationship between a stage as the oblong object and its stage image.
Figure 8B:
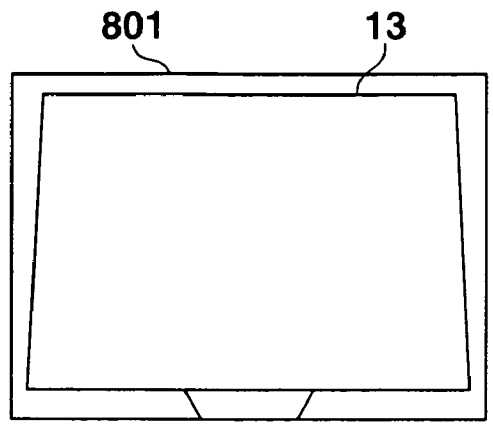

Specifically, for example, the document camera 1 shoots the stage 13 which is shown in FIG. 8A and has a known contour. Image data of the stage 13 as the object is acquired from the image data 801 shown in FIG. 8B which is generated by the image data generator 21. With the shape of the stage 13 on which the original 4 is placed being an oblong, the memory 201 prestores the length of each side of the stage 13. This eliminates the need for a particular object for the projection correction in addition to the original 4 and the stage 13.

Figure 8C:
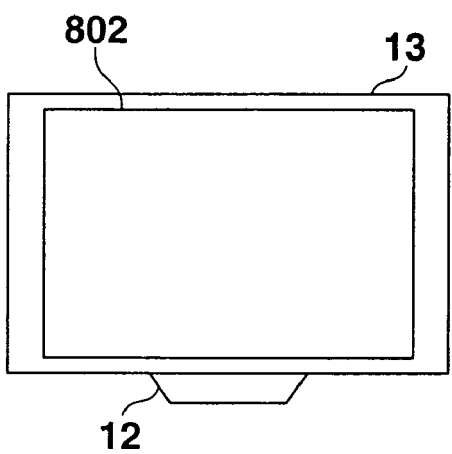

Alternatively, a shape drawn on the stage 13 as shown in FIG. 8C may be used as the known oblong figure 802.

Figure 8D:
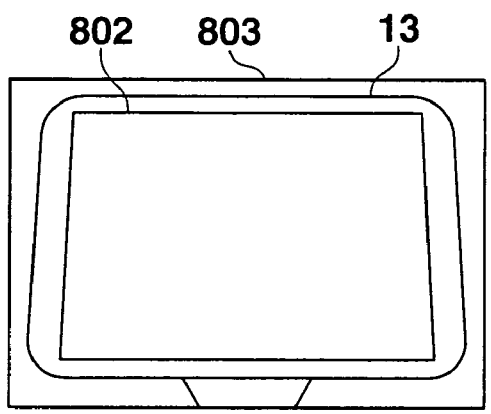

In this case, the interior of the oblong to be a standard may be marked with a color which differs from that of the exterior of the oblong. The document camera 1 shoots the stage 13 as the object, thereby acquiring image data 803 shown in FIG. 8D. The apex coordinates of the oblong to be the standard shown in FIG. 8D may be acquired from the image data 803 shown in that figure.

Figure 8E:
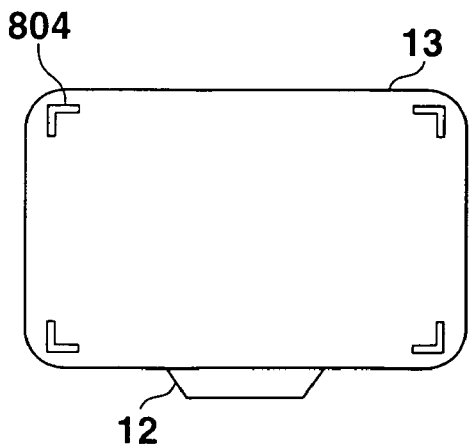

There is another method which uses L-shaped corner marks 804 drawn or impressed on the four corners of the stage 13, as shown in FIG. 8E. The corner marks 804 are apex indicators which indicate the apex locations of the oblong.

In this case, the locations of individual corner marks 804 are measured beforehand and stored in the memory 201, and, based on the locations of the respective corner marks 804, the four apex coordinates of the oblong to be the standard can be acquired.

In this case, for example, the color of the stage 13 is solid dark gray, and the colors of the corner marks 804 are white. The document camera 1 shoots the stage 13 on which the corner marks 804 are impressed (put) as the object, thereby acquiring image data 805 as shown in FIG. 8E. The image processing device 203 detects the locations of the four corner marks 804 of the image shown in FIG. 8E. The image processing device 203 acquires the four apex coordinates of the oblong to be the standard based on the locations of the detected corner marks 804.

The memory 201 prestores the contour of the stage 13 shown in FIG. 8A, the oblong on the stage 13 shown in FIG. 8C, or the length of each side of the oblong based on the locations of the corner marks 804 shown in FIG. 8E, in the process-image memory area 253.

The following description of the embodiment will discuss, as an example, a case where the projection correction parameter Atp is acquired in using the corner marks 804.

Figure 9A:
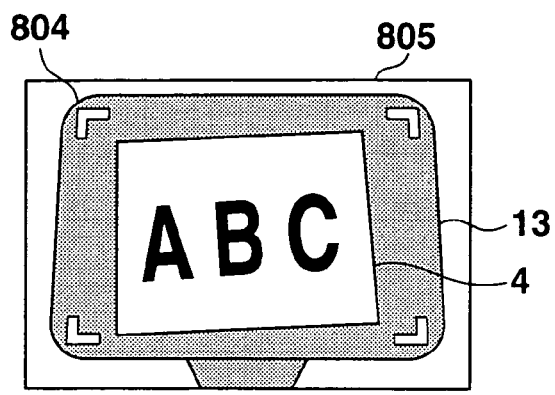
FIGS. 9A, 9B, 9C, 9D, and 9E are diagrams for explaining an operation for extracting an image of a corner mark in using the corner marks for acquiring projection correction parameter, and an operation for creating a masking image.
Figure 9B:
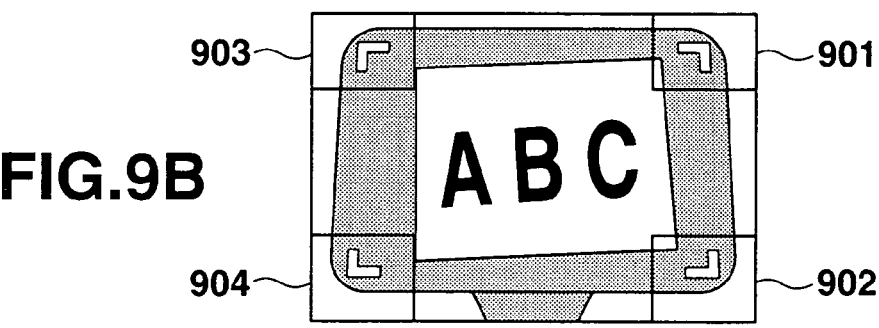

Because the locations of the corner marks 804 are already known, the image processing device 203 sets an image area including the locations of the corner marks 804 as clip areas 901 to 904, as shown in FIG. 9B, from the image data shown in FIG. 9A.

Figure 9C:
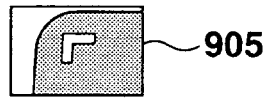

For example, in a case of the clip area 903 on the upper left corner in this diagram, the image processing device 203 clips out of image data within that clip area, and binarizes the image in the clip area 903 as shown in FIG. 9C, thereby obtaining a binarized image 905. For example, the colors of the corner mark and a table behind of the stage 13 are acquired as white, and that of a portion occupied by the stage 13 is acquired as black.

Figure 9D:
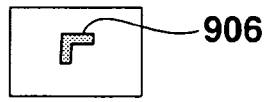

Using a technique like labeling, the image processing device 203 searches for a maximum white linked area which does not contact a boundary, and acquire a corner mark image 906 as shown in FIG. 9D. The image processing device 203 computes the centroid of the acquired corner mark image 906, and takes the computed centroid as one of the apexes of the oblong to be the standard. Meanwhile, the corner mark 804 may be a triangular mark or the like of a triangle. In this manner, the image processing device 203 performs the process of acquiring the corner mark images 906 on the other clip areas.

The locations of the four apexes of the oblong to be the standard are detected.

The image processing device 203 performs the rectangular acquisition process on the image data of the oblong obtained in this manner, thereby detecting the straight lines of the four sides of the oblong. The image processing device 203 computes an intersection from those straight line information, thereby obtaining the coordinates of the four apexes of the oblong to be the standard.

Next, when obtaining outline information, the image processing device 203 computes the projection correction parameter Atp from the obtained coordinates (x0,y0), (x1, y1), (x2,y2), and (x3,y3) of the four apexes, using the equation of FIG. 40B, and stores the computation result in the work-data memory area 255 of the memory 201.

Figure 8F:
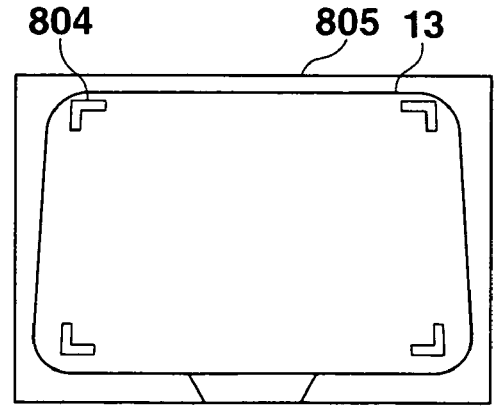

The projection correction parameter Atp is for transforming the oblong in FIG. 8F indicated by the images of the corner marks into the oblong in FIG. 8E indicated by the corner marks in a projection transformation manner.

The image processing device 203 stores the computed projection correction parameter Atp in the work-data memory area 255. After that, when detecting the replacement of the original 4 by the image-motion detection process, the image processing device 203 reads out the projection correction parameter Atp from the work-data memory area 255, and uses it at the still-motion projection process to be discussed later.

Figure 9E:
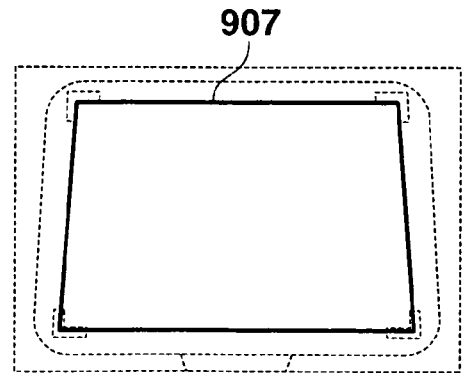

When executing a masking process at the rectangular acquisition process, the image processing device 203 generates a masking image 907 with a rectangular area shown in FIG. 9E, based on the values of the four apex coordinates (x0,y0), (x1,y1), (x2,y2), and (x3,y3). As mentioned above, the masking image 907 is used for the rectangular acquisition process.

When obtaining the masking image 907, the image processing device 203 stores the flag of Projection_Result_Flag, indicating the acquisition of the projection correction parameter Atp, in the work-data memory area 255 of the memory 201. When obtaining the projection correction parameter Atp, for example, the image processing device 203 sets "1" to the flag of Projection_Result_Flag.

In contrast, when the corner mark image 906 is not detected, thereby failing to accurately acquire the location of the oblong to be the standard, the image processing device 203 sets a value indicating the failure of the acquisition of the projection correction parameter to the flag of Projection_Result_Flag, and stores it in the work-data memory area 255 of the memory 201. When the image processing device 203 could not acquire the projection correction parameter Atp, for example, the image processing device 203 sets "0" to the flag of Projection_Result_Flag.

(8. Rotation-correction-parameter Acquisition Process)

Next, an explanation will be given of the process of acquiring the rotation correction parameter Arf. In the rotation-correction-parameter acquisition process, the image processing device 203 acquires a straight line representing the outline of the original 4 from the image data before the rotation correction shown in FIG. 6B. The image processing device 203 computes the tilts of the sides of the original 4 relative to the sides of the stage 13 on the stage U-V coordinate system 602, and acquires the rotation correction parameter Arf which rotates the image data by the angle indicated by that tilts. In this process, the image processing device 203 executes the processes of computing an image area, occupied by the original 4, from the outline thereof, and acquiring a clip area of the image area which is occupied by the original 4.

The image processing device 203 uses the following parameters when executing the rotation-correction-parameter acquisition process.

(a) Rotation-Correction-Control Flag, Rotate_Control_Flag

The rotation-correction-control flag of Rotate_Control_Flag indicates whether or not the rotation correction is to be performed. The CPU 207 sets the flag value of the flag of Rotate_Contorl_Flag, and stores it in the work-data memory area 255 of the memory 201. The image processing device 203 reads out this flag of Rotate_Control_Flag from the work-data memory area 255, and determines whether or not the rotation correction is to be performed. For example, the CPU 207 sets "1" to the flag of Rotate_Control_Flag, when executing the rotation correction, and sets "0" to that flag when executing no rotation correction. When the flag of Rotate_Control_Flag is set as "1", the image processing device 203 executes the rotation correction. In contrast, when that flag is set to "0", the image processing device 203 does not execute the rotation correction.

(b) Clipping Control Flag, Fitting_Control_Flag

The clipping control flag of Fitting_control_Flag indicates whether or not to carry out the process (clipping process) of fitting the size of the image of the clipped original 4 in that of the original 4, and maximizing the image data to be projected on the screen 3. The CPU 207 sets the flag value of the clipping control flag of Fitting_Contorl_Flag, and stores it in the work-data memory area 255 of the memory 201. For example, the CPU 207 sets "1" to the flag of Fitting_Control_Flag, when executing the clipping process, and sets "0" to that flag when executing no clipping process. The image processing device 203 reads out that flag value from the work-data memory area 255. When the flag of Fitting_Control_Flag is set to "1", the image processing device 203 executes the clipping process. In contrast, when that flag is set to "0", the image processing device 203 does not execute the clipping process.

(c) Parameter (x max, y max) for acquiring the sizes of the sensor-image memory area 251, and 252 for storing the input image data p(x,y)

(d) Parameter (u min, u max, v min, v max) for acquiring the size of the display-image memory area 254 for storing the output image data P(u,v)

First, the image processing device 203 zooms down the image data including the original 4 shot by the document camera 1 at a high resolution, and executes the projection correction, thereby generating projection-corrected reduced image.

That is, in the embodiment, in acquiring the tilts of the original 4 and the stage 13, if the image data obtained by shooting is directly used, as the projection-correction process takes a lot of time, the image data is reduced. The size of the projection-corrected reduced image is acquired from the relationship between the accuracy necessary for computing the tilts of the original 4 and the stage 13, and the amount of computation when the generated reduced image data is used. However, an embodiment which performs the projection correction without reducing the image data may be employed.

If the size of the projection-corrected image data is (size in U direction, size in V direction)=(U smax, V smax), the image processing device 203 conforms the image data size of a portion, occupied by the stage 13, as (size in U-direction, size in V-direction)=(U sc, V sc). If the coordinate system of the reduced image is U-V, the equation of FIG. 40A can be expressed by the equation of FIG. 41.

As mentioned above, the image processing device 203 uses the following three parameters to execute the projection correction with image reduction on the original image data.

(a) affine transformation parameter At expressed by the equation of FIG. 42

(b) parameter representing image size of input image data: x max, y max (c) parameter representing range for projection transformation of output image data: U smax, V smax The image processing device 203 executes the detection process of the rectangular to be shot, on the output image data, thereby acquiring the outline of the original 4.

If the original 4 is an oblong, as shown in FIGS. 10A to 10E, there are five conditions as the conditions of the size of the original 4 and the placement thereof.

Figure 10A:
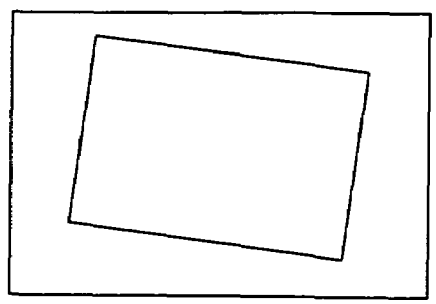
FIGS. 10A, 10B, 10C, 10D, and 10E are diagrams for explaining the relationship between positions of an original and a stage, and straight lines to be detected.

As shown in FIG. 10A, the first condition is a case where the outline of the original 4 is entirely included on the stage 13.

Figure 10B:
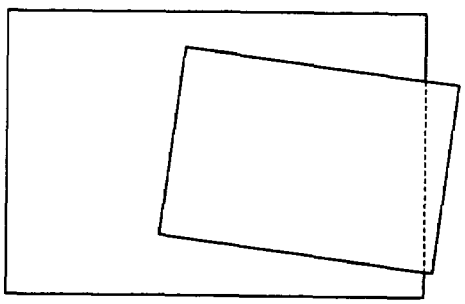

As shown in FIG. 10B, the second condition is a case where one side of the original 4 is out from the stage 13, so that only the straight lines of the three sides are detected.

Figure 10C:
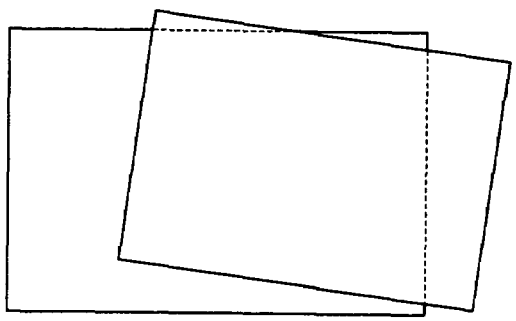

As shown in FIG. 10C, the third condition is a case where two sides of the original 4 are out from the stage 13, so that only the straight lines of the two sides are detected.

Figure 10D:
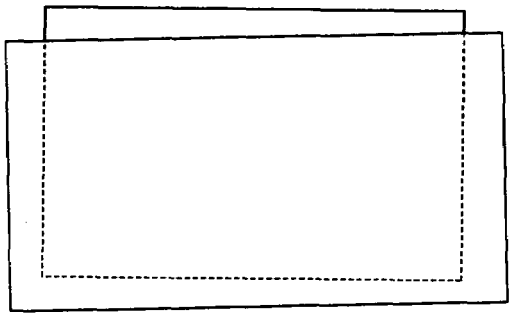

As shown in FIG. 10D, the fourth condition is a case where only one straight line of the side of the original 4 is detected.

Figure 10E:
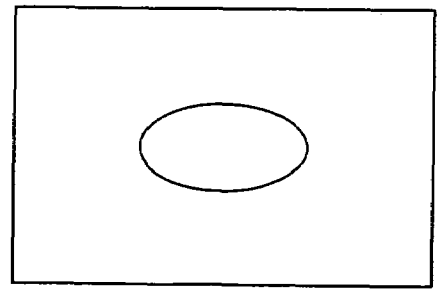

As shown in FIG. 10E, the fifth condition is a case where another object other than the original 4 is placed on the stage 13, so that no straight line is detected at all.

In response to those conditions, the image processing device 203 executes the rotation correction and the process of the clipping of the image data.

First, an explanation will be given of a case shown in FIG. 10A. The image processing device 203 computes the tilt of the original 4 relative to the stage 13.

The tilt can be computed as follows. The image processing device 203 distinguishes the longitudinal sides, and the transversal sides from the straight lines indicating the outline of the original 4 included in the image data. For the longitudinal sides, the image processing device 203 acquires the differences from the 90° tilting, and, for the transversal sides, the image processing device 203 acquires the differences from the 0° tilting. The image processing device 203 takes the average of those differences as the tilt θp relative to the stage 13. In using the tilt θp, the equation shown in FIG. 43A can be approved between the coordinates on the stage U-V coordinate system 602 and the coordinates on the rotation-correction p-q coordinate system 603.

An inverse transformation can be expressed by the equation of FIG. 43B.

Figure 11A:
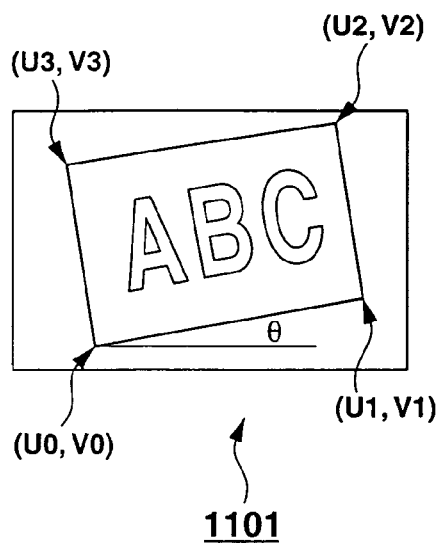
FIGS. 11A, 11B, 11C, and 11D are diagrams for explaining a process of acquiring an inclination of an image corresponding to an original at the stage U-V coordinate system.
Figure 11B:
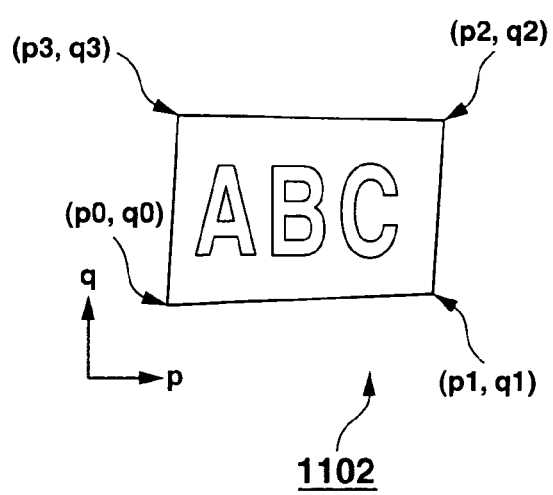

The image processing device 203 executes the rotation correction in accordance with the equation of FIG. 43A. For example, as shown in FIG. 11A, suppose that the apex coordinates of projection-corrected image data 1101 on the stage U-V coordinate system 602 are (U0, V0), (U1, V1), (U2, V2), and (U3, V3). Using those apex coordinates on the stage U-V coordinate system, the image processing device 203 executes the projection correction in accordance with the equation of FIG. 43A. As shown in FIG. 11B, using the rotation-correction p-q coordinate system 603, the image processing device 203 computes the apex coordinates of rotation-corrected image data 1102, (p0, q0), (p1,q1), (p2,q2), and (p3,q3).

Figure 11C:
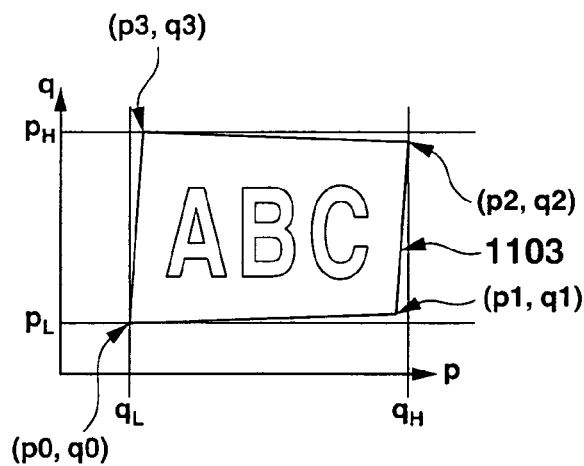

As illustrated in FIG. 11C, the image processing device 203 acquires a circumscribed square 1103 relative to the rotation-corrected image data 1102, and clips an image so as to minimize the circumscribed square 1103.

In case of this diagram, with the circumscribed square 1103, the coordinates of one of the four apexes of the square, which is the nearest apex to the origin of the rotation-correction p-q coordinate system 603, being (pL,qL), and the coordinates of the apex of that diagonal point being (pH, qH), pL, qL, pH, and qH are acquired from the equation of FIG. 44A.

Figure 11D:
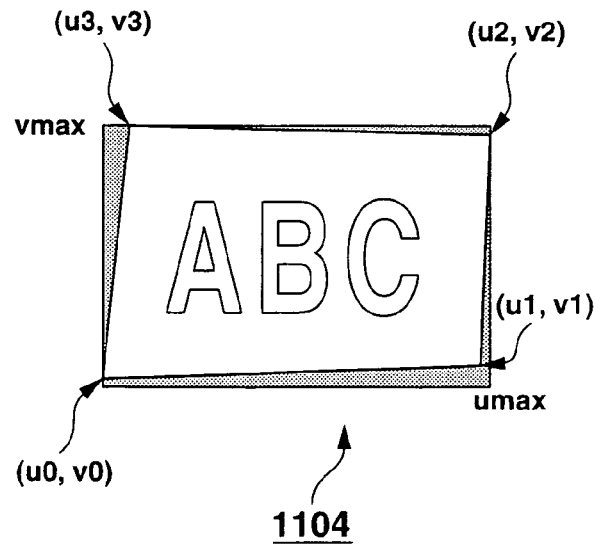

The image processing device 203 fits the image data, clipped along the circumscribed square 1103 shown in FIG. 11C, into the size of the output image data as shown in FIG. 11D, thereby obtaining clipped image data 1104.

In contrast, as shown in FIGS. 10B to 10D, when unable to detect the sides of the original in the rectangular acquisition process, the image processing device 203 acquires the clip area by the following procedures.

That is, if the object is a square like the original 4, the image processing device 203 uses the sides of the stage 13 represented by the boundary thereof, that is, the top, bottom, right, and left sides, in place of the undetected sides of the original 4. If the top side of the original 4 is not detected, for example, the image processing device 203 uses the top side of the stage 13 in place of the top side of the original 4. This will allow the image processing device 203 to obtain the four sides of the circumscribed square 1103. For the obtained image data, the image processing device 203 executes the rotation correction, acquires the circumscribed square 1103, and executes the fitting as per the case of FIG. 10A.

When it is determined that the object placed on the stage 13 is not a square as shown in FIG. 10E, the image processing device 203 executes the clipping only without the rotation correction. In this case, using the equation shown in FIG. 44A, the image processing device 203 computes the maximum and minimum values for p and q components from the coordinates (pi,qi) of the image data generated by the rectangular acquisition process. The image processing device 203 obtains the minimum circumscribed square 1103.

The rotation correction parameter Arf for carrying out the rotation correction and the clipping process in using those values, can be expressed by the equations of FIGS. 44B and 44C.

(9. Image Projection Process)

The image projection process is for allowing the projector 2 to project the image data obtained by shooting before the original 4 is placed on the stage 13, or when the original 4 is replaced.

The image processing device 203 reads out the image data stored in the sensor-image memory areas 251, and 252 of the memory 201 by the image data generator 21, copies that image data in the display-image memory area 254 of the memory 201, and executes the above-described image compression process. The video output device 202 reads out the image data stored in the display-image memory area 254, and outputs it to the projector 2.

(10. Still-picture Projection Process)

Figure 28A:
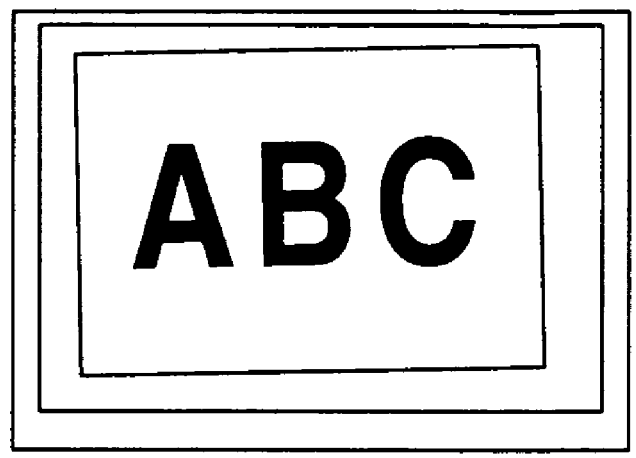
FIGS. 28A, 28B, and 28C are diagrams for explaining image processing of the conventional imaging apparatus.
Figure 28B:
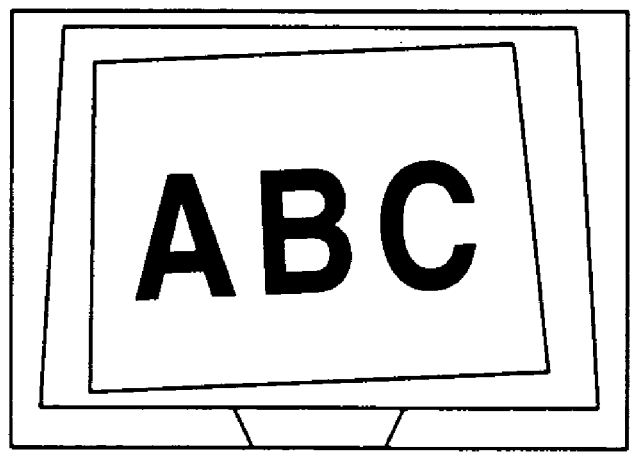
Figure 28C:
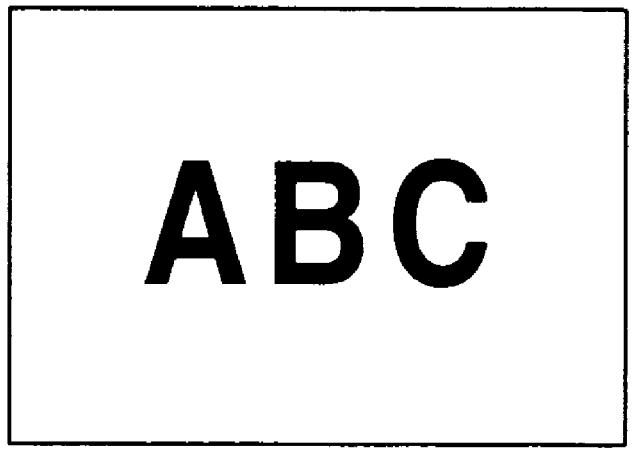
Figure 29A:
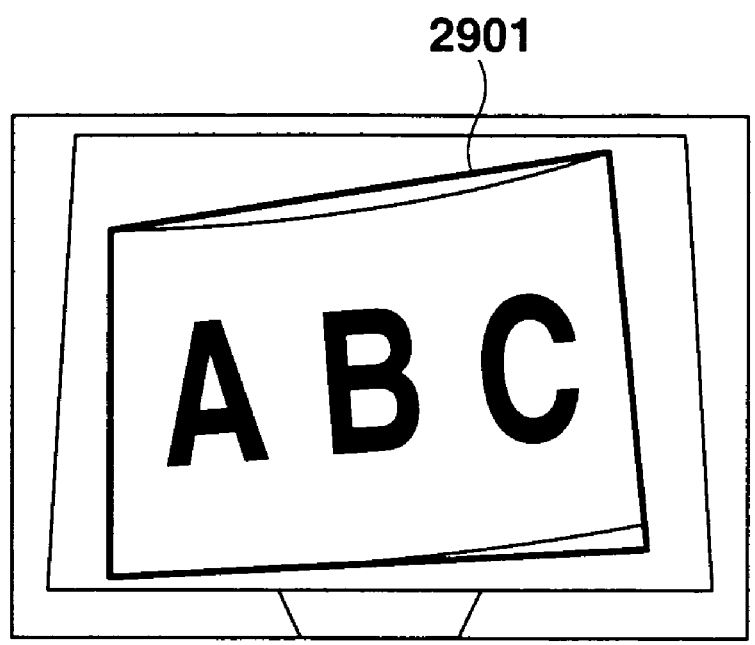
FIGS. 29A and 29B are diagrams for explaining a problem of the conventional technology.
Figure 29B:
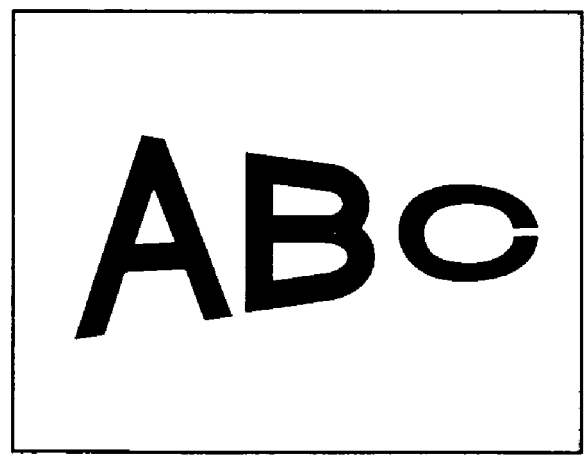

The still-picture projection process allows the projector 2 to transformation image data shown in FIGS. 28A and 28B into image data shown in FIG. 28C, if it is determined that the shot object is at rest. This process allows the projector 2 to project the transformed image data on the screen 3.

Using the equation shown in FIG. 35A, the image processing device 203 acquires a combined affine parameter At from three of the affine parameters Azm, Arf, and Atp computed by the above-described methods.

Next, the image processing device 203 executes the image conversion process with the following three parameters.

(a) affine transformation parameter At (b) parameter (x max, y max) for acquiring the sizes of the sensor-image memory areas 251, and 252 for storing input image data p(x,y)

(c) parameter (u min, u max, v min, v max) for acquiring the size of the display-image memory area 254 for storing output image data P(u,v)

The image processing device 203 acquires image data undergone front correction and zooming process.

Upon acquisition of the image data undergone front correction and zoom process, the image processing device 203 executes a process like an image-data enlargement process on that image data. That is, the image processing device 203 transforms the image data into image data that the user can easily recognized. This process is called a clarification process.

The image processing device 203 stores the clarified image data in the display-image memory area 254 of the memory 201. The video output device 202 reads out the image data stored in the display-image memory area 254 to output it to the projector 2.

(Zoom-parameter Correction Process)

Next, an explanation will be given of the operation executed by the CPU 207 when the zoom-up key 42A, the zoom-down key 42B of the operation section 204 are pressed by the user.

When the shooting mode is set to the still-picture mode, and it is determined that the original 4 or the stage 13 is at rest by the image-motion detection process executed by the image processing device 203, the CPU 207 receives the signal input from the zoom control key 42A or 42B, or the display shift key 43A, 43B, 43C, or 43D. When one of the zoom control keys or one of the display shift keys is pressed, the CPU 207 executes the process of correcting the zoom parameter Azm in order to execute the process like zooming of the projected still-image data.

Before discussing the zoom-parameter correction process, the zoom parameter Azm will be discussed.

The zoom parameter Azm is not changed by the above-described affine transformation. Accordingly, the entire area of the image data which has undergone image processing by transformation with the projection correction parameter Atp and the rotation correction parameter Arf is enlarged and displayed.

The zoom parameter Azm is a transformation parameter for enlarging a part of the input image data, and can be expressed by the equation of FIG. 45A.

In the equation, "Zoom" is an magnification. "Cx" and "Cy" represent base points for the enlargement process. In the embodiment, the base points Cx and Cy are located on the bottom left of the image.

Next, the zoom-parameter correction process will be explained. Suppose that the maximum enlargement rate be MAX_ZOOM, and the size of the output image data be (the number of transverse pixels, the number of longitudinal pixels)=(u max, v max).

First, when the initialization of the zoom parameter is performed, the CPU 207 sets Zoom=1, Cx=0, and Cy=0. Accordingly, the zoom parameter Azm becomes an identity matrix.

Next, the CPU 207 corrects the zoom parameter Azm based on information input from the operation section 204. In the correction process to the zoom parameter Azm, every time the zoom-up key 42A or the zoom-down key 42B is pressed, the magnification changes for each ZOOM_RATIO. When any one of the display shift keys 43A to 43D is pressed, the central coordinates of the output image data shifts by MOVE_STEP on the output-image-data coordinate system.

In the embodiment, when the zoom-up key 42A or the zoom-down key 42B is pressed at once, the CPU 207 enlarges the zoom ratio Zoom by ZOOM_RATIO times, or reduces it by 1/ZOOM_RATIO. The zoom ration may be set as to become larger (or smaller).

Next, the CPU 207 checks the computed zoom ratio Zoom. That is, if the condition indicated by the equation of FIG. 45B is satisfied, the CPU 207 corrects the zoom ratio Zoom. MAX_ZOOM_RATIO in the equation is the maximum enlargement factor, and is a predetermined value. For example, if up to ×8 enlargement is possible in the image conversion process which is executed by the image processing device 203, then the MAX_ZOOM_RATIO becomes "8".

When the right or left display key 43A or 43B is pressed by the user, the CPU 207 executes multiplication or subtraction of Cx by MOVE_STEP/Zoom. When the up-shift display key 43C or the down-shift display key 43D is pressed by the user, the CPU 207 executes multiplication or subtraction of Cy by MOVE_STEP/Zoom.

Next, in accordance with the equation of FIG. 45C, the CPU 207 checks the values of Cx and Cy. That is, the CPU 207 checks whether or not the range of the image data to be zoomed is appropriate.

Using the zoom ratio Zoom, Cx, and Cy, the CPU 207 computes the zoom parameter Azm, and stores it in the work data memory area 254.

(Explanation of Camera Basic Process)

Next, the operation of the imaging apparatus according to the embodiment will be explained.

When the user presses the power switch 41 of the document camera 1, the document camera 1 is powered on. The CPU 207 of the document camera 1 reads out the program code from the program-code memory area 206 to execute the camera basic process.

Figure 13:
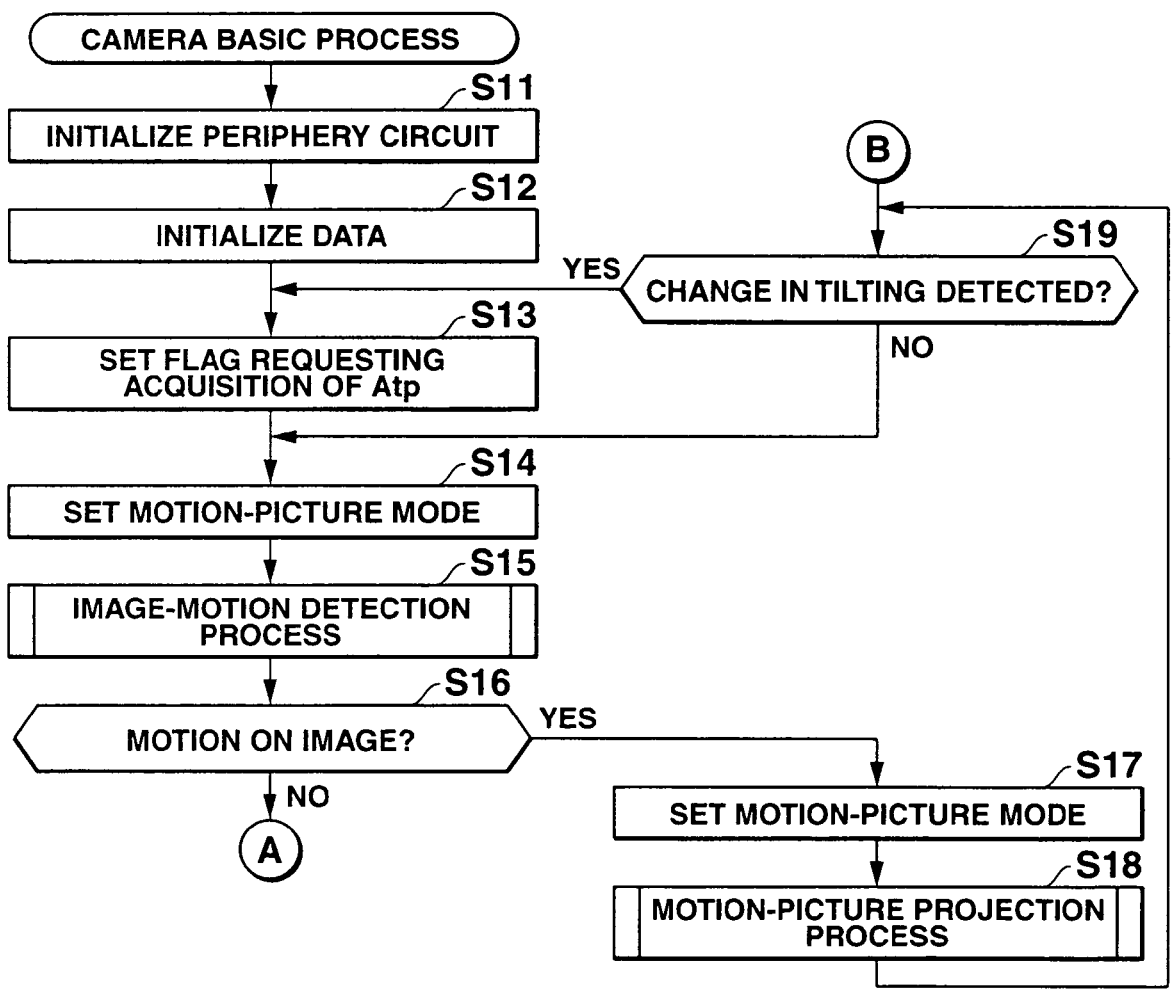
FIG. 13 is a flowchart illustrating the content of a camera basic process executed by the document camera in FIG. 1.
Figure 14:
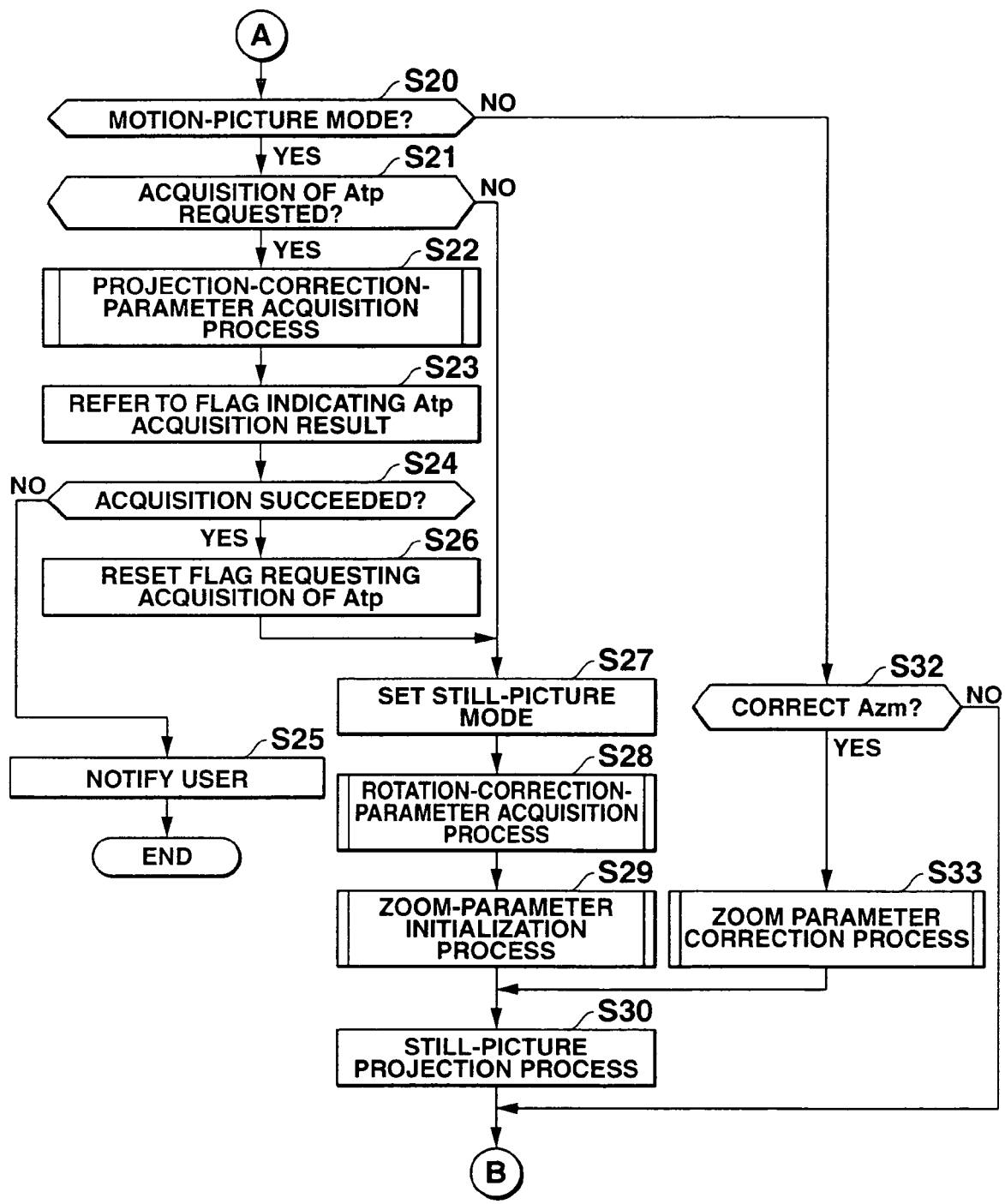
FIG. 14 is a flowchart illustrating the content of the camera basic process executed by the document camera in FIG. 1.

The camera basic process will be explained with reference to the flowcharts shown in FIGS. 13 and 14. First, the CPU 207 controls the peripheral circuit of the optical lens device 101 to carry out the focusing of the optical lens device 101, the correction of the position of the zoom lens and the aperture, the initialization of the video output device 202, and the like (step S11).

The CPU 207 initializes the memory 201 and data to be used in the image processing or the like (step S12).

The CPU 207 sets the flag of Projection_Control_Flag which requests the image processing device 203 to acquire the projection correction parameter Atp (step S13). At this time, the CPU 207 initializes the shooting conditions, such as the focus of the optical lens device 101, the shutter speed, the exposure time, the exposure like the aperture, the white balance, and the ISO sensitivity. The CPU 207 initializes various kinds of parameters for acquiring the shooting conditions.

Next, the CPU 207 sets the shooting mode to the motion-picture mode, and allows the optical lens device 101 to shoot the object at a row resolution (step S14). The CPU 207 alternately writes image data, obtained by the image sensor 102, in the sensor-image memory areas 251 and 252 of the memory 201.

The CPU 207 allows the image processing device 203 to execute the image-motion detection process (step S15). When executing the image-motion detection process, the image processing device 203 sets data to the flag of Motion_Control_Flag indicating whether or not there is a motion in the image data. For example, when it is determined that there is a motion in the image, the image processing device 203 sets "1" to the flag of Motion_Control_Flag, and, when it is determined that there is no motion, the image processing device 203 sets "0" to that flag. The work-data memory area 255 stores that flag. The flow of the image-motion detection process will be explained in detail later.

Based on the value of the flag of Motion_Control_Flag, indicating whether or not there is a motion in the image data, and stored in the work-data memory area 255 of the memory 201, the CPU 207 determines whether or not there is a motion in the shot image data (step S16).

When having determined that there is a motion in the shot image data (step S16: YES), the CPU 207 sets the shooting mode to the motion-picture mode (step S17).

The CPU 207 allows the image processing device 203 to execute the motion-picture projection process (step S18). The motion-picture projection process is a process of compressing the image data and storing the compressed image data in the memory 201. The flow of the motion-picture projection process will be explained in detail later.

The CPU 207 determines whether or not the tilt detection section 205 detects the change in the tilting of the pole brace 12 (step S19). For example, when detecting the change in the tilting of the pole brace 12, the tilt detection section 205 notifies the CPU 207 the change in the tilting of the pole brace 12. Alternatively, the tilt detection section 205 may set data to a flag of Gradient_Control_Flag indicating whether or not the tilt of the pole brace 12 is changed, and the CPU 207 may read out that flag to carry out the determination. In this case, the flag of Gradient_Control_Flag may be stored in, for example, the work-data memory area 255 of the memory 201, and may be rewritten by the tilt detection section 205. For example, when detecting the change in the tilting of the pole brace 12, the tilt detection section 205 sets "1" to the flag of Gradient_Control_Flag, and, when detecting the unchanging, the tilt detection section 205 sets "0" to that flag.

When detecting that the tilt of the pole brace 12 is not changed (step S19: NO), the CPU 207 sets the shooting mode to the motion-picture mode, and allows the optical lens device 101 to shoot the object at a row resolution (return to step S14).

When it is determined that the tilt of the pole brace 12 is changed (step S19: YES), the CPU 207 allows the image processing device 203 to set the flag of Projection_Control_Flag, requesting the acquisition of the projection correction parameter Atp (return to step S13).

In contrast, at the step S16, when it is determined that there is no motion in the shot image data (step S16: NO), the CPU 207 determines whether or not the shooting mode is the motion-picture mode (step S20).

When the shooting mode is the motion-picture mode (step S20: YES), the CPU 207 reads out the flag of Projection_Control_Flag which indicates whether or not to request the image processing device 203 to acquire the projection correction parameter Atp (step S21).

When the value indicating the acquisition of the projection correction parameter Atp is set to the flag of Projection_Control_Flag (step S21: YES), the CPU 207 allows the image processing device 203 to execute the projection-correction-parameter acquisition process (step S22). The projection-correction-parameter acquisition process is a process of computing the projection correction parameter Atp from the image data obtained by shooting the optical lens device 101. The image processing device 203 sets data to the flag of Projection_Result_Flag which indicates whether or not the projection correction parameter Atp is acquired. Upon acquisition of the projection correction parameter Atp, for example, the image processing device 203 sets "1" to the flag of Projection_Result_Flag, and, when that parameter has not been acquired, the image processing device 203 sets "0" to that flag. The work-data memory area 255 of the memory 201 stores the flag of Projection_Result_Flag. The flow of the projection-correction-parameter acquisition process will be explained in detail later.

The CPU 207 refers to the value of the flag of Projection_Result_Flag, stored in the work-data memory area 255, and indicating whether or not the projection correction parameter Atp is acquired (step S23).

Based on the value of the flag of Projection_Result_Flag, the CPU 207 determines whether or not the acquisition of the projection correction parameter Atp is succeeded (step S24).

When the flag of Projection_Result_Flag stores the value indicating that the projection correction parameter Atp is not acquired (step S24: NO), the CPU 207 notifies the user that the projection correction by the image processing device 203 is failed (step S25), and terminates the camera basic process. Alternatively, the flow may return to the step S11, so that the CPU 207 starts over the camera basic process. For example, the CPU 207 lights up the LEDs 46 and 47, included in the operation section 204, in the predetermined lighting pattern, thereby notifying the user. Alternatively, the CPU 207 reproduces the predetermined audio data to notify the user. In this case, the document camera 1 may further include the audio output device including a D/A converter which converts the predetermined audio data into the analog signal, a speaker, etc. The CPU 207 may allow the audio output device to reproduce the predetermined audio data which represents that the image processing is unable.

In contrast, when the flag of Projection_Result_Flag stores the value indicating that the projection correction parameter Atp is acquired (step S24: YES), the CPU 207 resets the flag of Projection_Control_Flag which requests the image processing device 203 to acquire the projection correction parameter Atp (step S26). For example, the CPU 207 sets "0" to the flag of Projection_Control_Flag.

The CPU 207 sets the shooting mode to the still-picture mode. That is, the CPU 207 allows the optical lens device 101 to shoot the object at a high resolution (step S27).

The CPU 207 allows the image processing device 203 to execute the rotation-correction-parameter acquisition process (step S28). The flow of the rotation-correction-parameter acquisition process will be explained in detail later.

The CPU 207 executes the zoom-parameter initialization process (step S29). The flow of the zoom-parameter initialization process will be explained in detail later.

The CPU 207 allows the image processing device 203 to execute the still-picture projection process (step S30). The flow of the still-picture projection process will be explained in detail later.

The CPU 207 again determines whether or not the tilt detection section 205 detects the change in the tilting of the pole brace 12 (return to step S19). The processes at and after the step S19 are the same as the above-described processes.

At the step S21, when the value indicating the request of the acquisition of the projection correction parameter is set to the flag of Projection_Control_Flag (step S21: YES), the CPU 207 reads out the projection correction parameter Atp from the work-data memory area 255 of the memory 201. The CPU 207 sets the shooting mode to the still-picture mode (step S27), and executes the above-described processes at and after the step S28.

At the step S20, when the shooting mode is not the motion-picture mode (step S20: NO), the CPU 207 determines whether or not to correct the zoom parameter (step S32). This determination is performed in accordance with the fact whether or not the user presses the zoom control keys 42A, 42B, and the display shift keys 43A to 43D of the operation section 204.

When having determined not to correct the zoom parameter (step S32: NO), the operation of the CPU 207 returns to the step S19.

In contrast, when having determined to correct the zoom parameter (step S32: YES), the CPU 207 executes the zoom-parameter correction process (step S33). The zoom-parameter correction process is a process of enlarging or reducing the image data, output by the document camera 1, in accordance with zoom control keys 42A, 42B, and the display shift keys 43A to 43D of the operation section 204 pressed by the user. The flow of the zoom-parameter correction process will be explained in detail later.

Subsequently, the CPU 207 allows the image processing device 203 to execute the still-picture projection process (step S30). Apparently, the CPU 207 repeats the camera basic process.

(Image-motion Detection Process)

Figure 15:
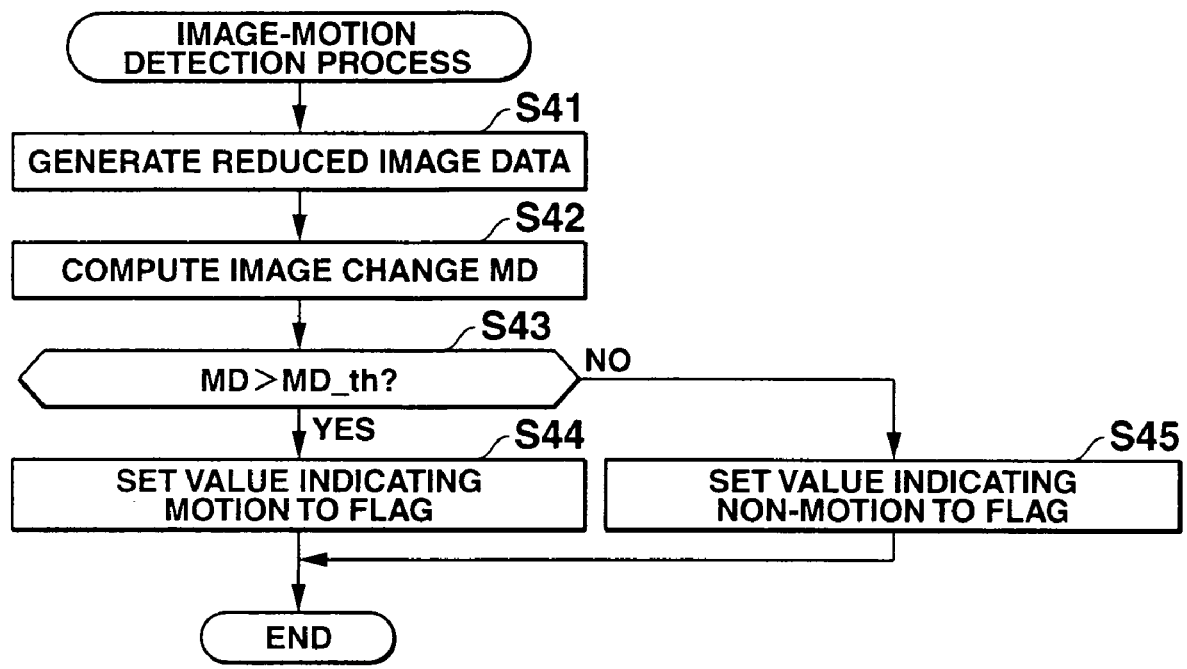
FIG. 15 is a flowchart illustrating the content of an image-motion detection process executed by the document camera in FIG. 1.

Next, an explanation will be given of the image-motion detection process, which is executed by the image processing device 203 at the step S15 in accordance with the instruction from the CPU 207, with reference to the flowchart in FIG. 15.

This process compares image data D1 generated by the image processing device 21 at a time T1, with image data D2 generated by the image processing device 21 at another time T2 to detect whether or not image data has any change larger than a predetermined threshold.

First, the image processing device 203 reduces the size of the image data obtained by shooting, thereby generating reduced image data (step S41). Although the image data is reduced to speed up the image-motion detection process in the embodiment, the non-reduced original data may be used instead.

Next, the image processing device 203 reads out reduced image data, generated at a time at which the previous image-motion detection process was performed, from the process-image memory area 253. The image processing device 203 compares the previous reduced image data with the currently generated image data, and computes an image change MD by using the equation shown in FIG. 33 (step S42).

The image processing device 203 reads out the threshold MD_th prestored in a threshold memory area 256. The image processing device 203 compares the computed image change MD with the threshold MD_th to determine whether or not the image change MD is greater than the threshold MD_th (step S43).

When having determined that the image change MD is greater than the threshold MD_th (step S43: YES), the image processing device 203 sets the value indicating the motion in the image to the flag of Motion_Control_Flag which indicates the motion-detection result, and stores that flag in the work-data memory area 255 of the memory 201 (step S44). In the embodiment, the value "1" is stored in the flag of Motion_Control_Flag.

In contrast, when having determined that the image change MD is less than or equal to the threshold MD_th (step S43: NO), the image processing device 203 sets the value indicating that the image is at rest to the flag of Motion_Control_Flag which indicates the motion-detection result, and stores that flag in the work data memory area 255 of the memory 201 (step S45). In the embodiment, the value "0" is stored in the flag of Motion_Control_Flag.

The image processing device 203 detects whether or not there is a motion in the image data generated by the image data generator 21.

(Motion-picture Projection Process)

Figure 16:
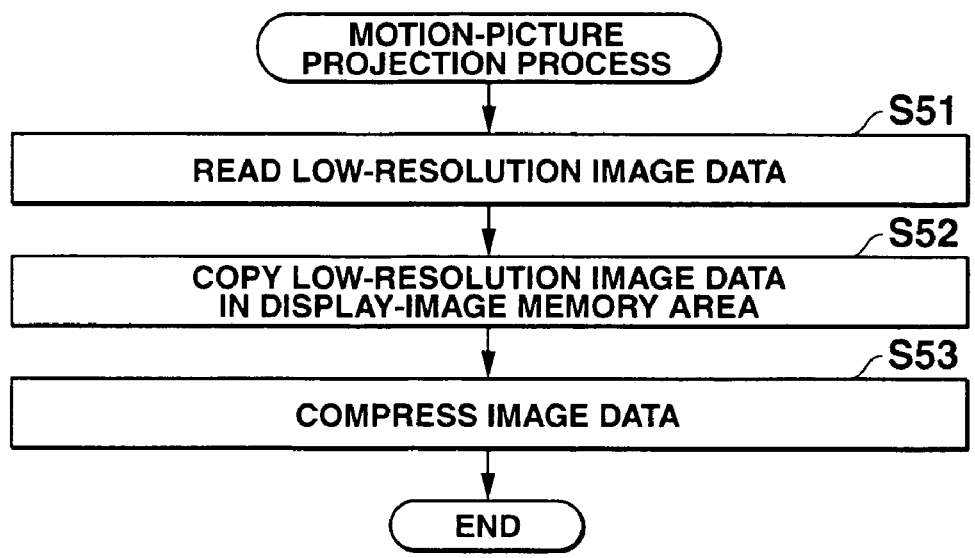
FIG. 16 is a flowchart illustrating the content of a motion-picture projection process executed by the document camera in FIG. 1.

Next, an explanation will be given of the motion-picture projection process, which is executed by the image processing device 203 at the step S18 in accordance with the instruction from the CPU 207, with reference to the flowchart in FIG. 16.

This process reads out low-resolution image data, obtained by shooting in the motion-picture mode, from the memory 201, and outputs the read-out data to the projector 2.

First, the image processing device 203 alternately reads out image data shot at low-resolutions from the sensor-image memory area 251 or 252 of the memory 201 (step S51). The image data D1 shot at the time T1 is stored in the sensor-image memory area 251 (or the sensor-image memory area 252). That is, while outputting the image data D1 in the sensor-image memory area 251, the image processing device 203 stores the image data D2 in the sensor-image memory area 252 in the memory 201. After storing the image data D2 is ended, the image processing device 203 outputs the image data D2 to the projector 2, while storing next data D3 in the sensor-image memory area 251. In this manner, the process of outputting image data to the projector 2 can be speeded up.

Next, the image processing device 203 copies the read-out data in the display-image memory area 254 (step S52).

The image processing device 203 executes the image compression process to compress the copied image data (step S53). The video output device 202 reads out the compressed image data from the display-image memory area 254, and outputs it to the projector 2.

The image processing device 203 executes the motion-picture projection process in the above-described manner.

(Projection-correction-parameter Acquisition Process)

Figure 17:
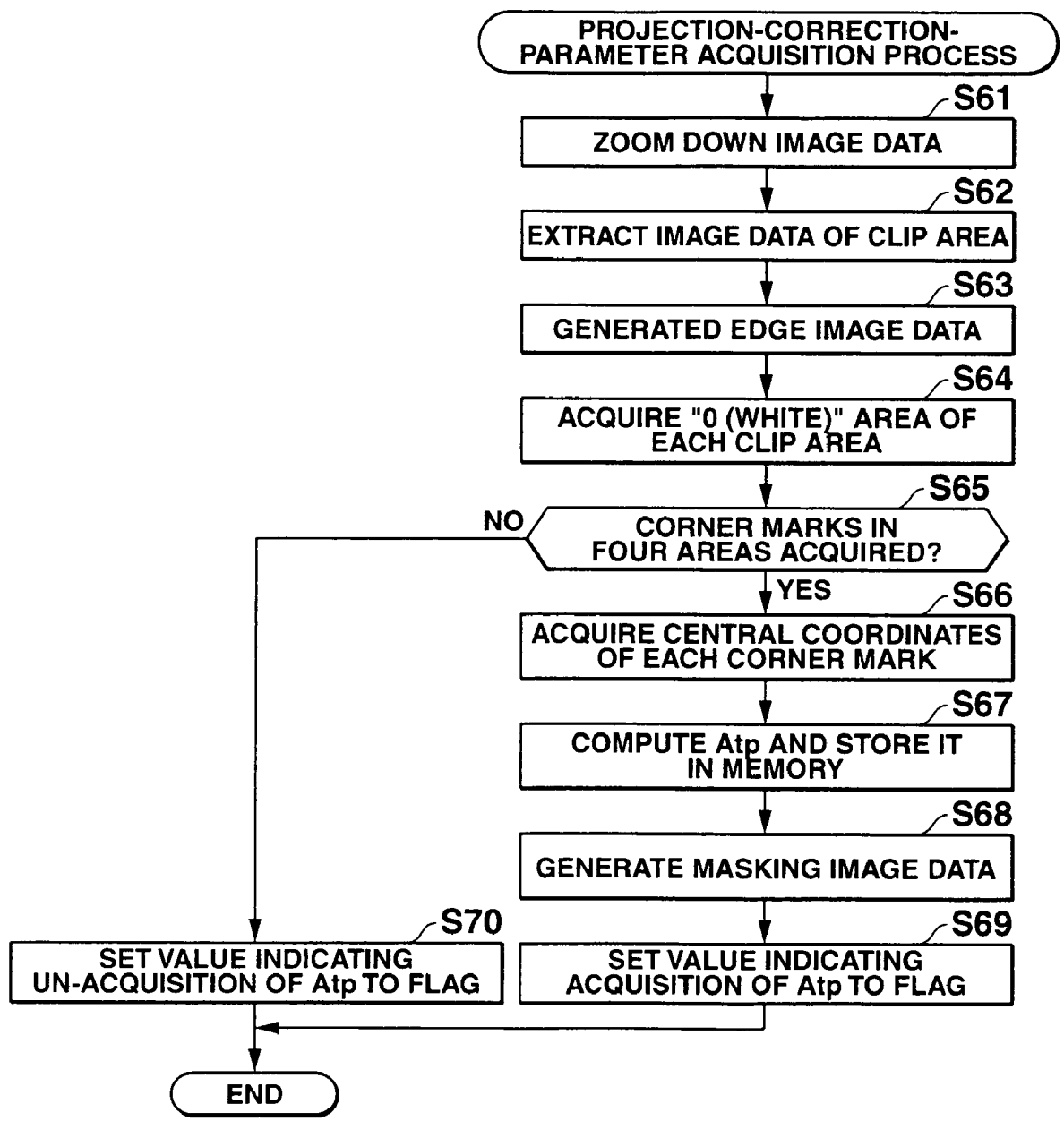
FIG. 17 is a flowchart illustrating the content of projection correction-parameter acquisition process executed by the document camera in FIG. 1.

Next, with reference to the flowchart of FIG. 17, an explanation will be given of the projection-correction-parameter acquisition process executed by the image processing device 203 at the step S22 in accordance with the instruction from the CPU 207.

The image processing device 203 executes a reduced-image generation process to generate reduced image data from a shot image (step S61). The image processing device 203 stores the generated reduced image data in the process-image memory area 253 of the memory 201. The original image data may be directly used without the compression.

The image processing device 203 extracts image data of portions of four corners from image data (step S62). For example, the image processing device 203 extracts image data of four clip areas shown in FIG. 9B.

The image processing device 203 generates bird edge image data with respect to the extracted image data of the clipped areas of the four corers (step S63). For example, an image area of the edge image data where the stage 13 and the original 4 exist is associated with "1" (black in FIG. 9C), and the other area like the corner mark or the like is associated with "0" (white in FIG. 9C).

Using the labeling method or the like, the image processing device 203 searches for the area of "0 (white)" which does not contact the boundary of the binarized edge image data, and acquires image data of the corner mark as shown in FIG. 9D (step S64).

The image processing device 203 determines whether or not the corner marks are acquired in the four clip areas (step S65).

When having determined that the corner marks are acquired in the four clip areas (step S65: YES), the image processing device 203 acquires the central coordinates of each corner mark area, and takes the acquire coordinates as the respective apexes of an oblong which indicates an area subject to the image processing (step S66). For example, the image processing device 203 computes the coordinates of the centroid of the oblong.

Using the equation shown in FIG. 41B, the image processing device 203 acquires the projection correction parameter Atp, and stores the acquired parameter in the work-data memory area 255 of the memory 201 (step S67).

The image processing device 203 generates the masking image data m for extorting an image area corresponding to the original 4, from the outline of the acquired square (step S68).

The image processing device 203 sets the value indicating the acquisition of the projection correction parameter Atp to the flag of Projection_Result_flag which indicates the acquisition of the projection correction parameter Atp (step S69). The image processing device 203 stores the flag of Projection_Result_flag in the work-data memory area 255.

In contrast, when having determined that the corner mark is not acquired in any one of the four areas (step S65: NO), the image processing device 203 sets the value indicating the non-acquisition of the projection correction parameter Atp to the flag of Projection_Result_flag (step S70). The image processing device 203 stores the flag of Projection_Result_flag in the work-data memory area 255.

The image processing deice 203 acquires the projection correction parameter Atp in the above-described manner.

(Rotation-correction-parameter Acquisition Process)

Figure 18:
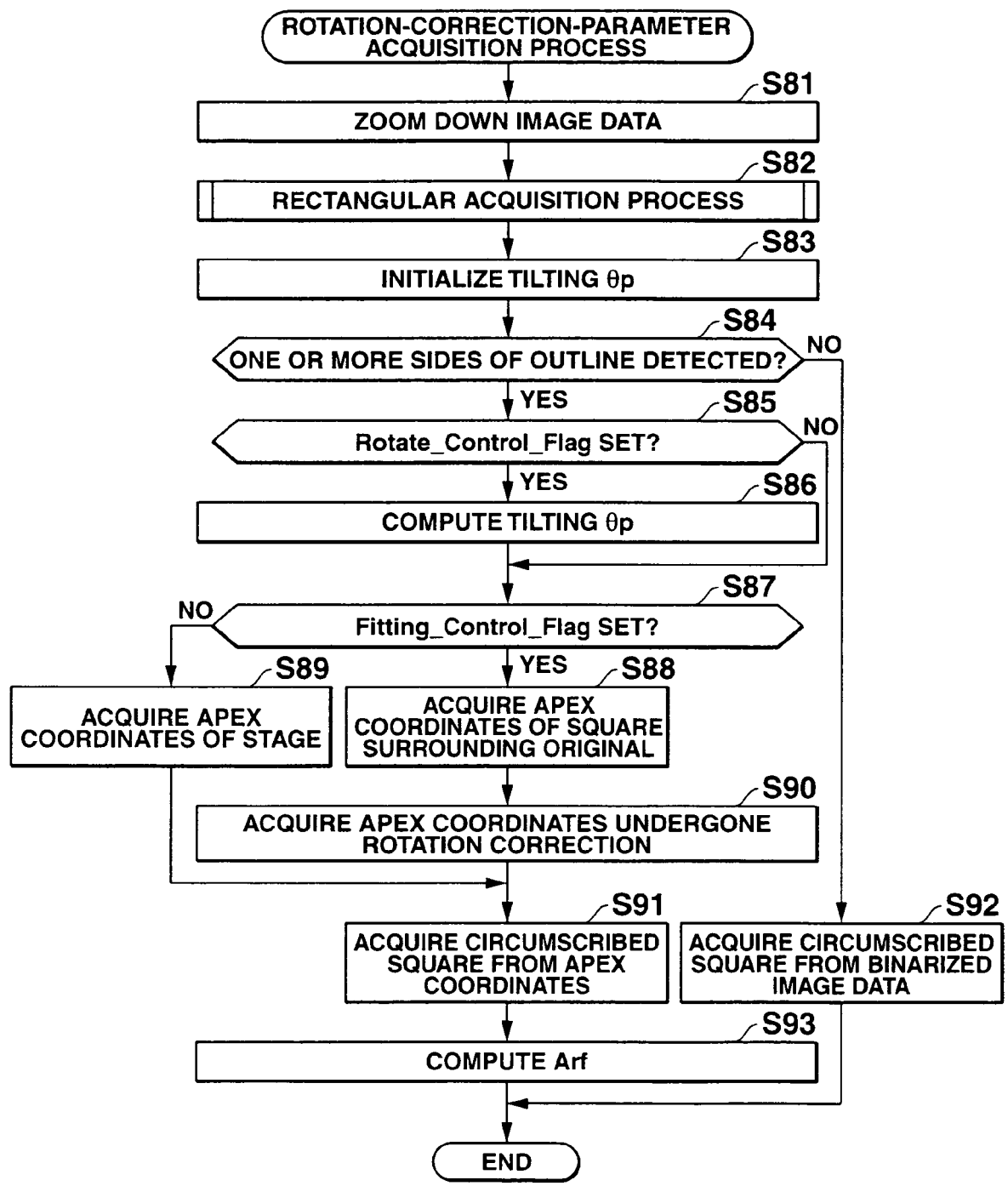
FIG. 18 is a flowchart illustrating the content of rotation correction parameter acquisition process executed by the document camera in FIG. 1.

Next, referring to the flowchart of FIG. 18, an explanation will be given of the rotation-correction-parameter acquisition process which is executed by the image processing device 203 at the step S29 in accordance with the instruction from the CPU 207.

First the image processing device 203 generates the reduced image data (step S81). Using the equation shown in FIG. 41, the image processing device 203 rescales the reduced image data into the stage U-V coordinate system. The image processing device 203 stores the generated reduced image data in the process-image memory area 253 of the memory 201.

Next, the image processing device 203 executes the rectangular acquisition process (step S82). The rectangular acquisition process detects the four straight lines corresponding to the outline of the original 4, and acquires information regarding the image data corresponding to the original 4. The flow of the rectangular acquisition process will be explained in detail later.

The image processing device 203 initializes the tilt θp of the image data relative to the original 4 to zero (step S83).

The image processing device 203 determines whether or not one or more straight lines corresponding to the outline of the original 4 are acquired (step S84).

When having determined that one or more straight lines are acquired (step S84: YES), the image processing device 203 computes the tilt θp of the image data corresponding to the original 4, based on the acquired straight lines, and clips the image data.

That is, the image processing device 203 refers to the value of the flag of Rotate_Control_Flag, which controls whether or not to execute the rotation correction, stored in the work-data memory area 255 of the memory 201 (step S85).

When having determined that the value indicating the execution of the rotation correction is set to the flag of Rotation_Control_Flag (step S85: YES), the image processing device 203 computes the tilt θp of the image data, based on the straight lines corresponding to the outline of the original 4 (step S86). That is, the image processing device 203 distinguishes the longitudinal straight lines and transversal straight lines between the straight lines indicating the outline of the original 4. The image processing device 203 acquires the differences from the 90° tilt for the longitudinal sides, and the differences from the 0° tilt for the transverse sides, and takes the average of those differences as the tilt θp of the image data including the original 4.

In contrast, when having determined that the value indicating that the rotation correction is not to be executed is set to the flag of Rotation_Control_Flag (step S85: NO), the image processing device 203 does not compute the tilt θp of the image data corresponding to the original 4.

Next, the image processing device 203 refers to the value of the flag of Fitting_Control_Flag, which is stored in the work-data memory area 255 of the memory 201, and controls whether or not the clipping process (step S87).

When having determined that the value indicating the execution of the clipping process is set to the flag of Fitting_Control_Flag (step S87: YES), the image processing device 203 acquires the apex coordinates (U0,V0), (U1,V1), (U2,V2), and (U3,V3) of the square which surrounds the image data corresponding to the original 4 on the stage U-V coordinate system (step S88).

In contrast when having determined that the value indicating that the clipping process is not to be executed is set to the flag of Fitting_Control_Flag (step S87: NO), the image processing device 203 acquires the apex coordinates of the image data corresponding to the stage 13 (step S89).

Using the acquired apex coordinates before the rotation correction and the tilt θp of the image data corresponding to the original 4, the image processing device 203 acquires the apex coordinates (p0,q0), (p1,q1), (p2,q2), and (p3,q3) on the rotation-correction p-q coordinate system (step S90).

In accordance with the equation shown in FIG. 44A, the image processing device 203 acquires the coordinates (pL,qL), (pH,qH) of the diagonal points from the apex coordinates (p0,q0), (p1,q1), (p2,q2), and (p3,q3) undergone rotation correction, and acquires the circumscribed square (step S91).

In contrast as illustrated in FIG. 10E, when having determined that none of the straight line corresponding to the outline of the original 4 is acquired (step S84: NO), the image processing device 203 does not execute the rotation correction on the original image and the clipping process, but acquires the circumscribed square from the binarized edge image data (step S92).

Using the equation shown in FIG. 44B, the image processing device 203 computes the rotation correction parameter Arf from the tilt θp of the image data corresponding to the original 4, and the acquired circumscribed square (step S93).

The image processing device 203 acquires the rotation correction parameter Arf in the above-described manner.

(Rectangular-acquisition Process)

Figure 19:
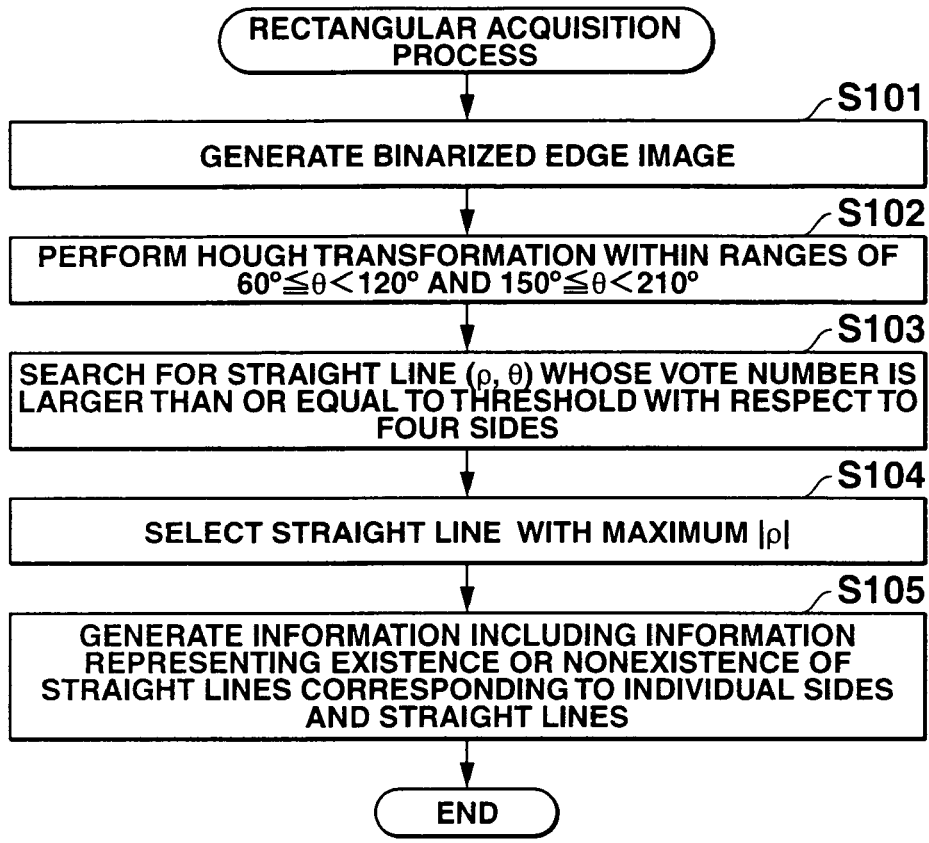
FIG. 19 is a flowchart illustrating the content of the rectangular acquisition process executed by the document camera in FIG. 1.

Next, with reference to the flowchart of FIG. 19, an explanation will be given of the rectangular-acquisition process which is executed by the image processing device 203 at the step S82 in accordance with the instruction from the CPU 207.

The image processing device 203 generates the edge image data, and stores this data in the process-image memory area 253 of the memory 201 (step S101).

To detect the straight lines corresponding to the outline of the original 4, using the equation shown in FIG. 32A, the image processing device 203 executes the Hough transform within the rages of 60°≦θ<120°, and 150°≦θ<210° (step S102).

Using the equation shown in FIG. 32B, the image processing device 203 acquires the point with the vote number larger than or equal to a predetermined threshold, within the ranges of 60°≦θ<120°, and 150°≦θ<210° (step S103). At this time, plural points may be acquired. In the range of 60°≦θ<120°, the point with the positive ρ corresponds to the top side, and the point with the negative ρ corresponds to the bottom side. In the range of 150°≦θ<210°, the point with the positive ρ corresponds to the left side, and the point with the negative ρ corresponds to the right side.

The image processing device 203 selects the candidate with the maxim absolute value of ρ, from the candidates for the respective straight lines of the four sides (step S104).

The image processing device 203 generates information including data (ρ,θ) which indicates the presence or absence of the straight lines corresponding to the respective sides, and the candidates of those straight lines (step S105).

The image processing device 203 detects the straight lines corresponding to the outline of the original 4 or the like, and executes the rectangular acquisition process in the above-described manner.

(Zoom-parameter Initialization Process)

Figure 20:
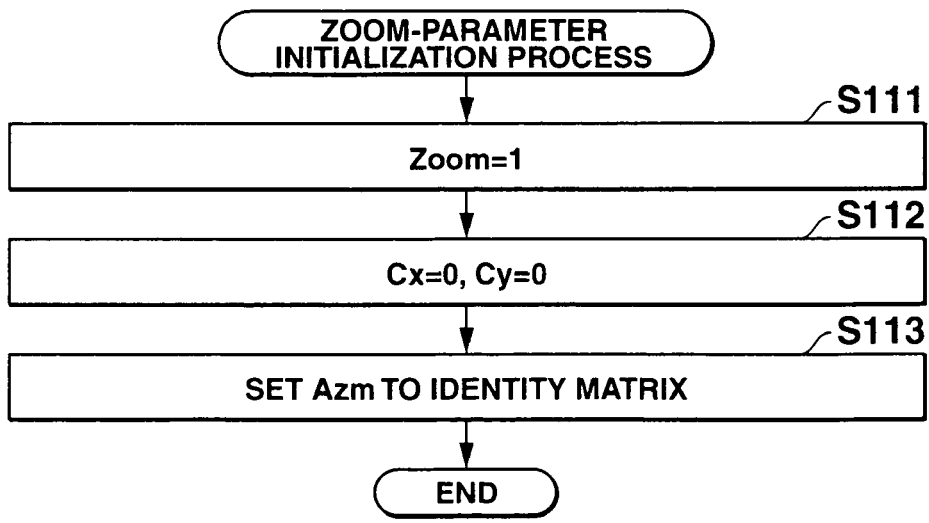
FIG. 20 is a flowchart illustrating the content of a zoom-parameter initialization process executed by the document camera in FIG. 1.

Next, referring to the flowchart of FIG. 20, an explanation will be given of the zoom-parameter initialization process which is executed by the CPU 207 at the step S30.

First, the CPU 207 sets the zoom ratio Zoom to 1 (step S111).

Next, the CPU 207 sets the parameters Cx and Cy, representing the base points for displaying the image data, to Cx=0, Cy=0 (step S112).

The CPU 207 sets the zoom parameter Azm to the identify matrix (Azm=1) (step S113).

The CPU 207 executes the zoom-parameter initialization process in this manner.

(Still-picture Projection Process)

Figure 21:
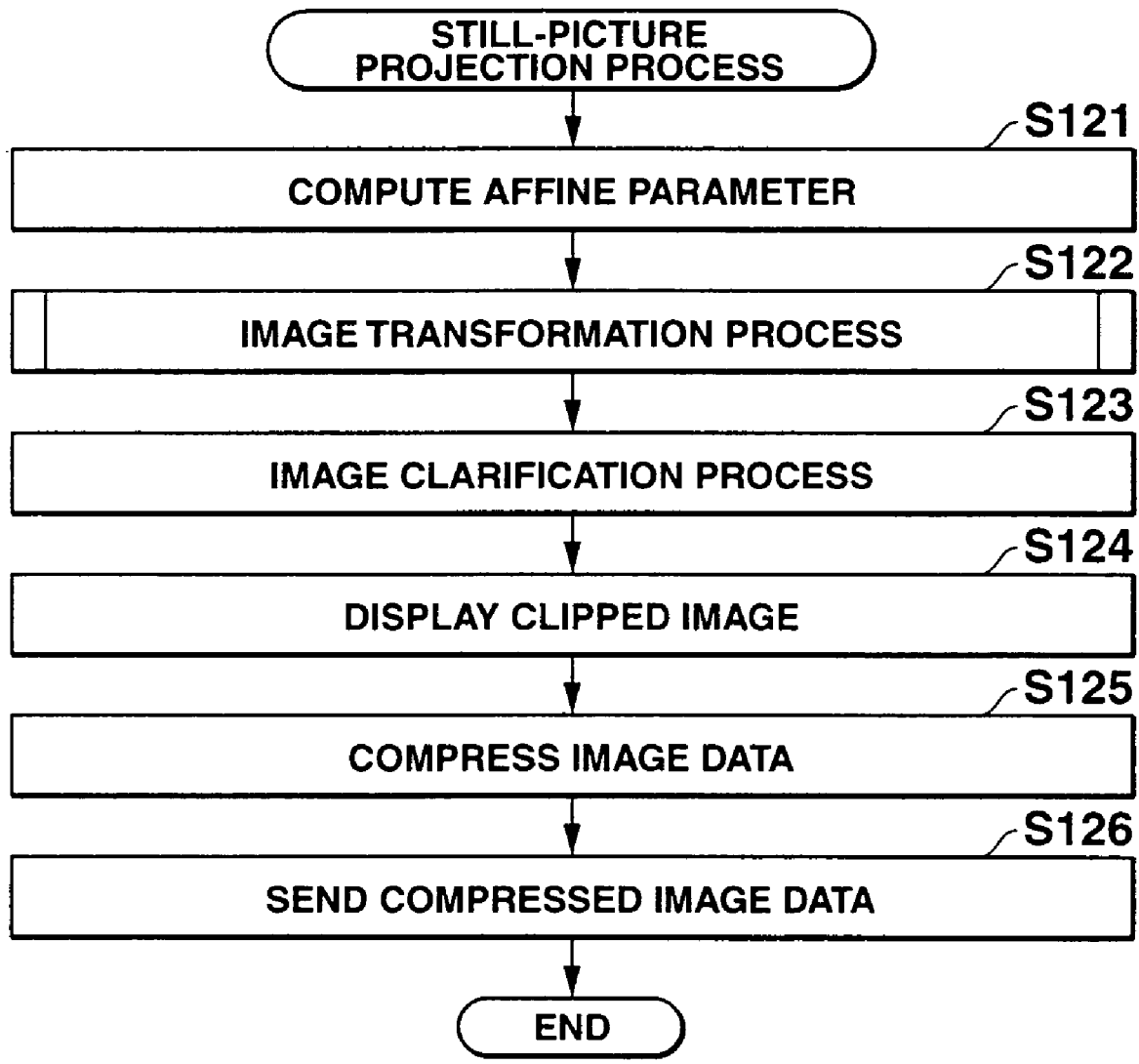
FIG. 21 is a flowchart illustrating the content of a still-picture projection process executed by the document camera in FIG. 1.

Next, with reference to the flowchart of FIG. 21, an explanation will be given of the still-picture projection process which is executed by the image processing device 203 at the step S31 in accordance with the instruction from the CPU 207.

First, using the equation shown in FIG. 35A, the image processing device 203 computes the affine parameter At (step S121).

The image processing device 203 executes the image conversion process (step S121). The image conversion process will be discussed later.

The image processing device 203 executes the image clarification process (step S123). That is, the image processing device 203 transforms the image data into the image data that the user can easily recognize. In a case where the entire image data whitely shines due to the large brightness value of the image data, for example, the image processing device 203 executes a process of decreasing the entire brightness value of the image data.

The image processing device 203 displays the clipped image data (step S124). The image processing device 203 compresses the image data (step S125).

The image processing device 203 sends the projector 2 the compressed image data (step S126), and terminates the still-image projection process.

The image processing device 203 outputs the still-image data to the projector 2 in the above-described manner.

(Image Conversion Process)

Figure 22:
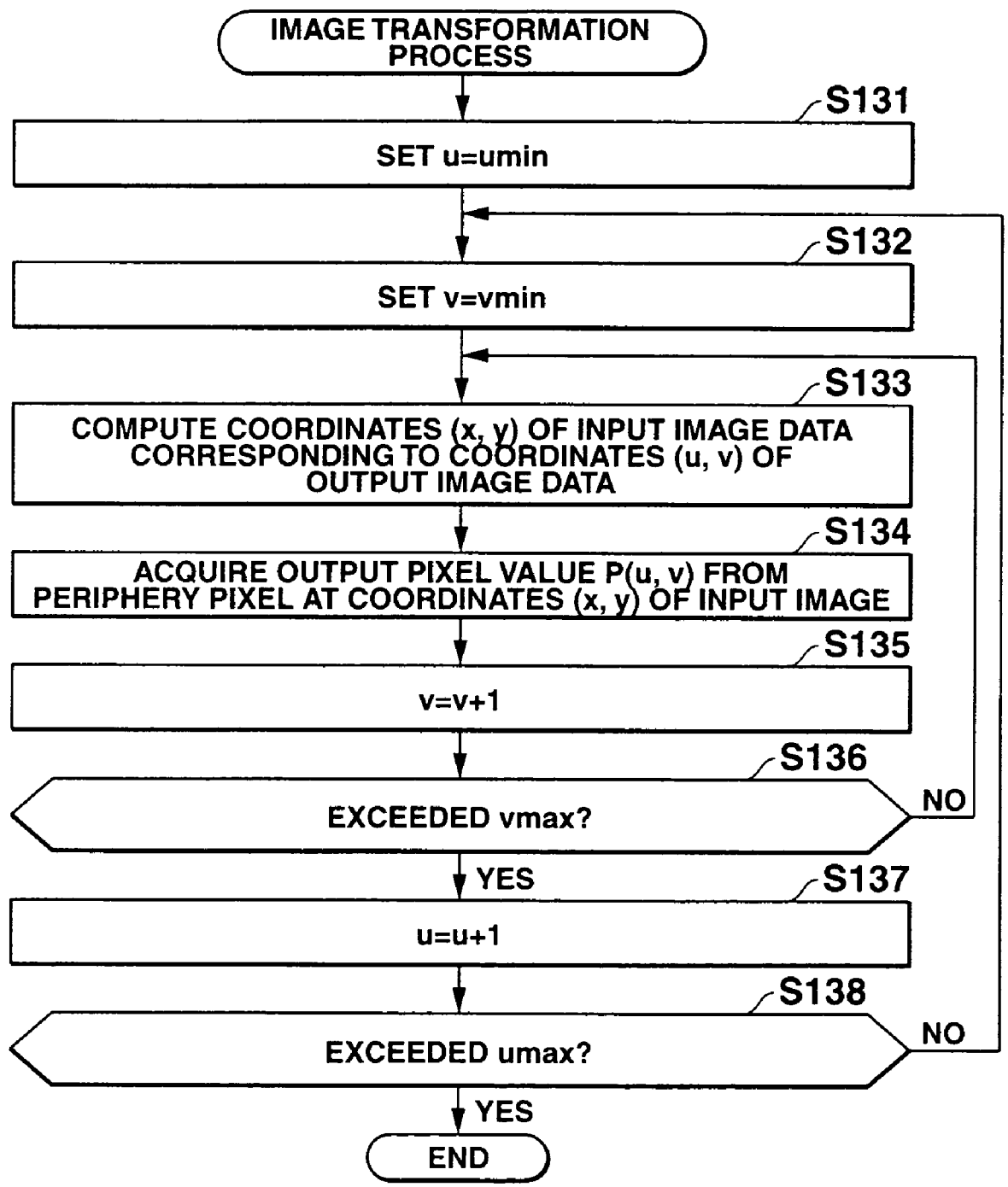
FIG. 22 is a flowchart illustrating the content of an image conversion process executed by the document camera in FIG. 1.

Next, referring to the flowchart of FIG. 22, an explanation will be given of the image conversion process which is executed by the image processing device 203 at the step S122 in accordance with the instruction from the CPU 207.

First, the image processing device 203 initializes the coordinate u on the output image data P on the output-image u-v coordinate system into the input parameter u min (step S131).

The image processing device 203 initializes the coordinate v on the output image data P on the output-image u-v coordinate system into the input parameter v min (step S132).

Using the affine parameter At and the equation shown in FIG. 35B, the image processing device 203 acquires the coordinates (x,y) of the input image data p which correspond to the coordinates (u,v) of the output image data P (step S133).

Using the equation shown in FIG. 37, the image processing device 203 acquires the pixel value P(u,v) of the output image data (step S134).

Next, the image processing device 203 increments the coordinate v (step S135). The image processing device 203 determines whether or not the coordinate v has exceeded the maximum value v max of the designated range (step S136).

When having determined that the coordinate v is less than or equal to the v max (step S136: YES), the image processing device 203 repeats the steps S133 to S135, and acquires the pixel values P(u,v) in order.

When having determined that the coordinate v has exceeded the v max (step S136: YES), the image processing device 203 increments the coordinate u (step S137).

The image processing device 203 determines whether or not the coordinate u has exceeded the maximum value u max of the designated range (step S138).

When having determined that the coordinate u is less than or equal to u max (step S138: NO), the image processing device 203 initializes the coordinate v (step S132), and acquires the pixel values P(u,v) of the output image from the origin of the straight line of that straight line, in order (repeats step S132 to S137).

In contrast, when having determined that the coordinate u has exceeded u max (step S138: YES), the image processing device 203.

The image processing deice 203 executes the image conversion process in this manner.

(Zoom-parameter Correction Process)

Figure 23:
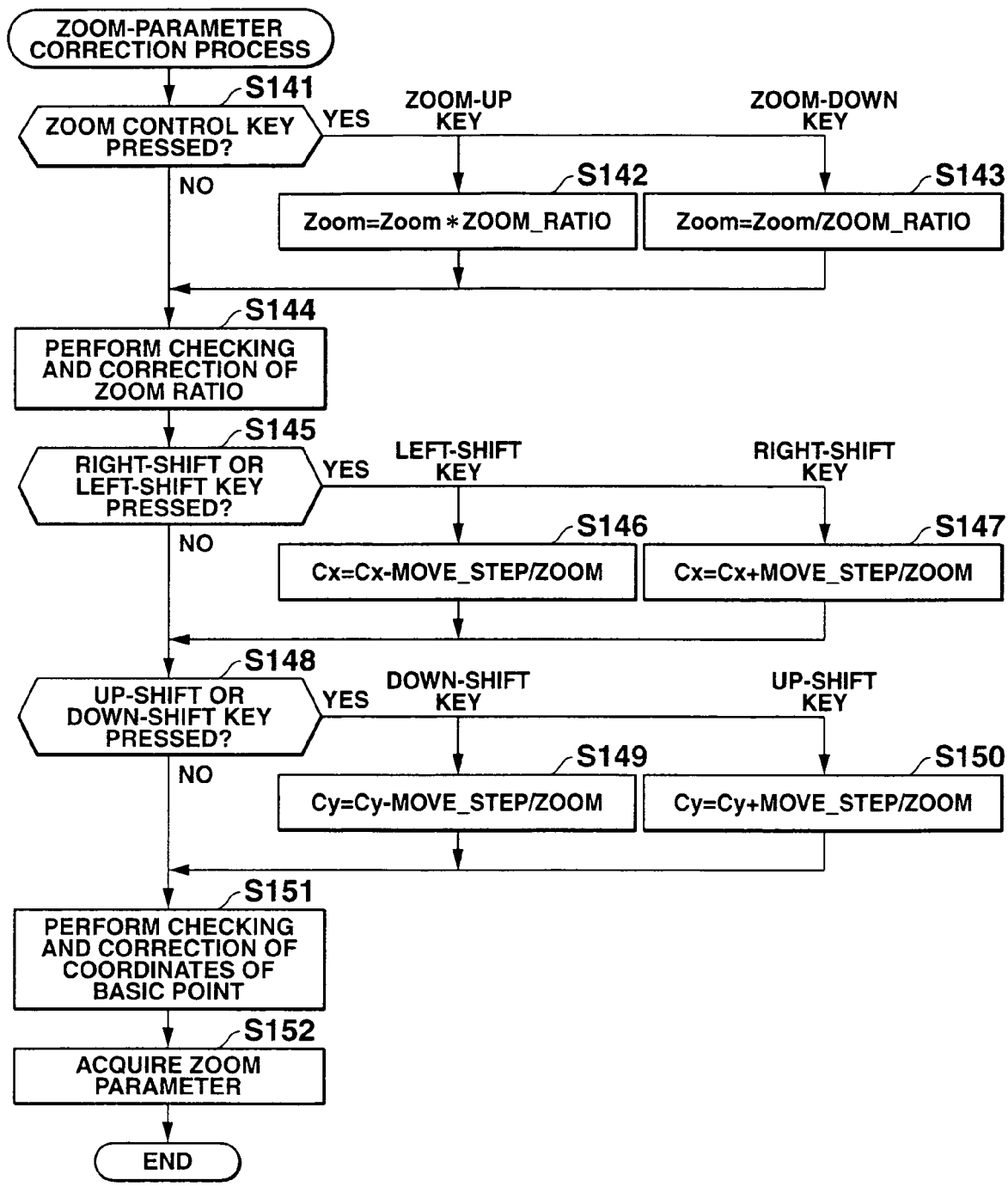
FIG. 23 is a flowchart illustrating the content of a zoom-parameter-correction process executed by the document camera in FIG. 1.

Next, with reference to the flowchart of FIG. 23, an explanation will be given of the zoom-parameter correction process which is executed by the image processing device 203 at the step S33 in accordance with the instruction from the CPU 207.

First, the CPU 207 determines whether or not the zoom control key 42A or 42B of the operation section 204 is pressed by the user (step S141).

When having determined that the zoom control key is pressed (step S141: YES), the CPU 207 acquires the type of the pressed key.

When having determined that the zoom-up key 42A is pressed by the user, the CPU 207 sets the zoom ratio Zoom to Zoom*ZOOM_RATIO (step S142).

When having determined that the zoom-down key 42B is pressed, the CPU 207 sets the zoom ratio Zoom to Zoom/ZOOM_RATIO (step S143).

When having determined that the zoom control key 42A or 42B is not pressed (step S141: NO), the CPU 207 executes the next process without correcting the zoom ratio.

Using the equation shown in FIG. 45B, the CPU 207 checks the zoom ratio, and, if the zoom ratio meets each condition, the CPU 207 corrects the zoom ratio (step S144).

Next, the CPU 207 determines whether or not the right-shift key 43B or the left-shift key 43A is pressed (step S145).

When having determined that the right-shift key 43B or the left-shift key 43A is pressed (step S145: YES), the CPU 207 acquires the type of the pressed key.

When having determined that the left-shift key 43A is pressed, the CPU 207 sets the parameter Cx, representing the base point for displaying the image data, to Cx=Cx−MOVE_STEP/Zoom (step S146).

When having determined that the right-shift key 43B is pressed, the CPU 207 sets the parameter Cx, representing the base point for displaying the image data, to Cx=Cx+MOVE_STEP/Zoom (step S147).

When having determined that the right-shift key 43B or the left-shift key 43A is not pressed (step S145: NO), the CPU 207 executes the next process without correcting the parameter Cx.

Next, the CPU 207 determines whether or not the up-shift key 43C or the down-shift key 43D is pressed (step S148).

When having determined that the up-shift key 43C or the down-shift key 43D is pressed (step S148: YES), the CPU 207 acquires the type of the pressed key.

When having determined that the up-shift key 43C is pressed, the CPU 207 sets the parameter Cy, representing the base point for displaying the image data, to Cy=Cy−MOVE_STEP/Zoom (step S149).

When having determined that the down-shift key 43D is pressed, the CPU 207 sets the parameter Cy to Cy=Cy+MOVE_STEP/Zoom (step S150).

When having determined that the up-shift key 43C or the down-shift key 43D is not pressed (step S148: NO), the CPU 207 executes the next process without correcting the parameter Cy.

Using the equation shown in FIG. 45C, the CPU 207 checks the values of the coordinates (Cx,Cy) of the base point to display the image (step S151). For example, when the values of the coordinates of that base point are over the range of the output image data, the CPU 207 corrects the values of the coordinates of that base point.

Using the equation shown in FIG. 45A, the CPU 207 computes the zoom parameter Azm from the zoom ratio, Cx, and Cy (step S152). The CPU 207 stores the generated zoom parameter Azm in the work data memory area 255 of the memory 201, and terminates the zoom-parameter correction process.

The image processing device 203 executes the zoom-parameter correction process in the above-described manner.

As explained above, according to the embodiment, the image processing device 203 detects a rectangular (oblong) which is represented by the outline of the stage 13 whose shape is known beforehand, or the corner marks, and acquires the projection correction parameter Atp.

Accordingly, even if the outline of the original 4 is not correctly acquired, or the original 4 warps, the image correction can be correctly performed.

The image processing device 203 stores the once-acquired projection correction parameter Atp in the memory 201, and, when the original 4 is replaced, the image processing device 203 reads out the projection correction parameter Atp from the memory 201 to execute the projection correction. Accordingly, unless the tilt of the pole brace 12 changes, the image processing device 203 can correctly execute the projection correction with the once-acquired projection correction parameter Atp, and thus execute the image processing faster.

In acquiring the projection correction parameter Atp by using the corner marks, because it is sufficient to put the corner marks which represent the range of placing the original 4 on the stage 13, the user does not get a factitious impression.

As the image processing device 203 executes not only the projection correction, but also the rotation correction and the process of correcting the zoom parameter, image data obtained by overhead shooting can be acquired and output.

Even if the outline or the like of the object, such as the original 4, is not acquired, the image processing device 203 can correct the tilt of the image data including the original 4 from one longitudinal straight line or one transverse straight line. Accordingly, even if the original 4 is out of the range where the document camera 1 can shoot, the tilt of the image data including the original 4 can easily be corrected. Moreover, even if none of the straight lines can be acquired from the object like the original 4, the image data obtained by the overhead shooting can be generated.

Because the image processing device 203 executes the image transformations, such as the projection correction and the rotation correction, by a single transformation from the shot image, the deterioration of the image due to the image transformation can be reduced.

When the object like the original 4 is an object which includes an oblique straight line, the rotation correction can be invalidated by pressing the rotation-correction validate switch 44 of the operation section 204, so that a proper image according to the placement condition of the original 4 can be acquired.

The CPU 207 controls the enlargement factor of the projection-corrected and rotation-corrected image data by using the straight line represented by the outline of the object. Accordingly, when the size of the original 4 is smaller than that of the stage 13, the user can obtain image data easy to see without operating the zoom-up key 42A or the like.

Various embodiments are possible to carry out the invention, which is not limited to the above-described embodiment For example, in the embodiment, as illustrated in FIGS. 8A to 8F, the projection correction parameter Atp is acquired by using the contour of the stage 13 with a known shape, a rectangle or corner marks printed on the surface of the stage 13.

Figure 24:
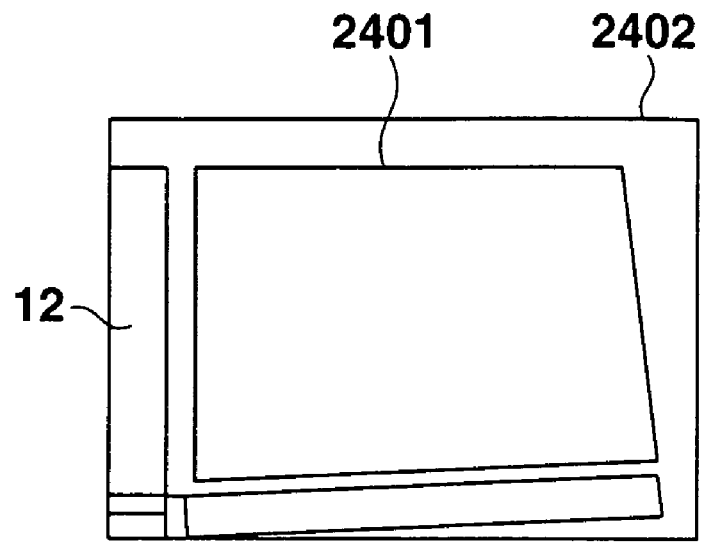
FIG. 24 is an explanatory diagram of an image of an oblong dummy original such that it can be within a camera shooting range.

The object to be shot, however, is not limited to those mentioned. A square object with a known contour shape, like an oblong dummy original 2401 which fits within the shooting range of the document camera 1, may be used. When the document camera 1 shoots the dummy original 2401, image data including the dummy original 2401 can be obtained as shown in FIG. 24. The image processing device 203 acquires a figure represented by the outline of the dummy original 2401, and compares the figure with the image data corresponding to the dummy original 2401, thereby acquiring the projection correction parameter Atp.

Figure 25:
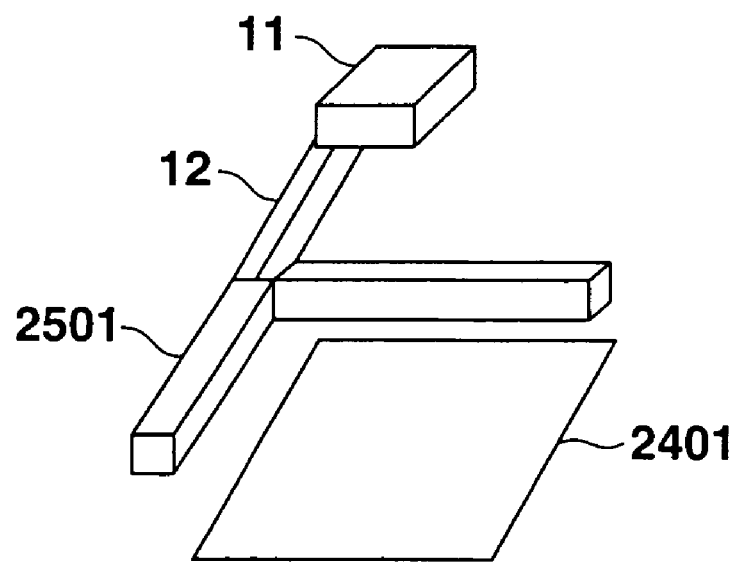
FIG. 25 is an explanatory diagram of an embodiment of a document camera with a foldable stage.

In this case, the stage 13 becomes unnecessary. As shown in FIG. 25, for example, the document camera 1 may be so structured as to have spreadable legs 2501. Such a structure allows the legs 2501 to take a foldable structure, and can make the document camera 1 very portable.

In the embodiment, a target polygon is an oblong. The shape, however, is not limited to an oblong, and may be a triangle, a pentagon, or a polygon having more than five sides.

In acquiring the projection correction parameter Atp by using the corner marks 804, the number of the corner marks 804 is set to four. Because the parameter $a_{33}$ shown in the equation of FIG. 34A may be set to 1, however, the number of the corner marks 804 is not limited to four. As long as four or more corner marks are used, the projection correction parameter Atp can be acquired. Those points may be placed at arbitrary locations as long as they lie on the plane stage 13.

Figure 26:
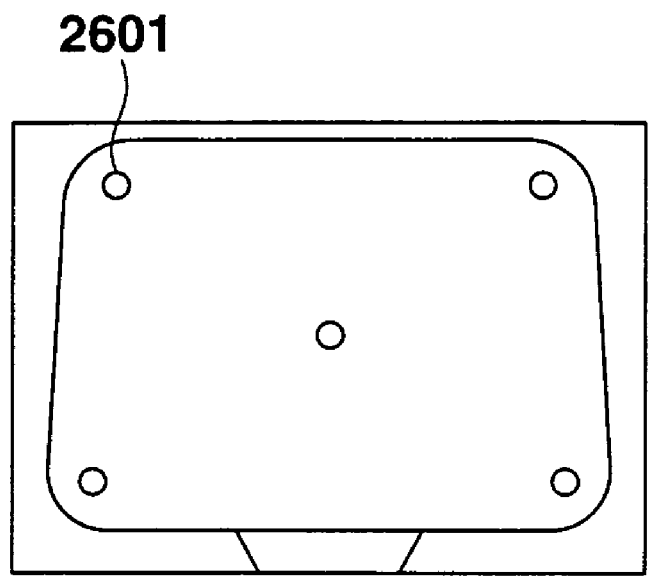
FIG. 26 is a diagram for explaining an embodiment where marks are put on five spots on the stage.
Figures 27A, 27B:
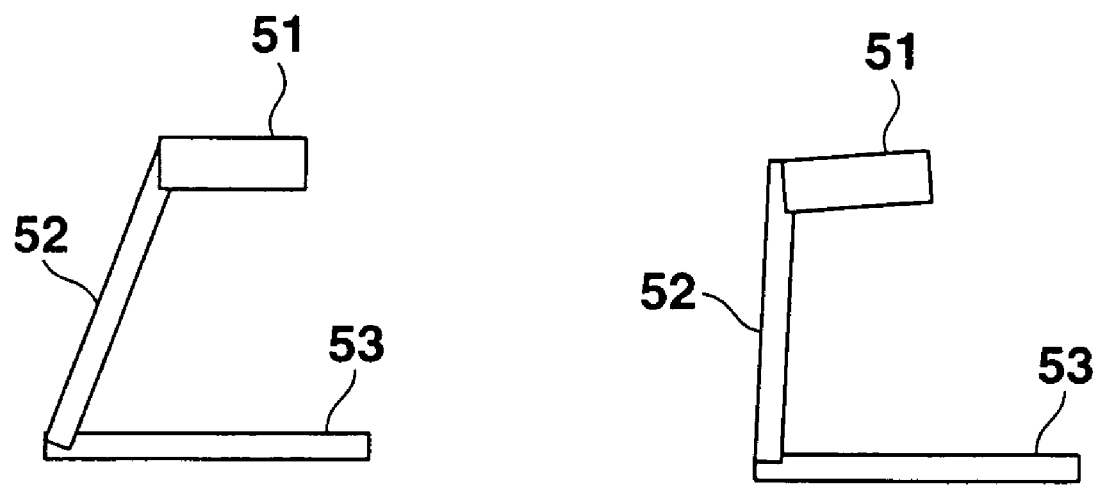
FIGS. 27A and 27B are diagrams for explaining the structure of a conventional imaging apparatus.

As shown in FIG. 26, for example, marks 2601 may be printed at five locations of the stage 13, and the coordinates of those marks 2601 may be detected. In this case, although the number of the equations becomes greater than the number of the parameters, the most appropriate projection correction parameter Atp can be acquired by using a method like the least square method.

The imaging apparatus may include a computer The computer may include the image processing device 203, and execute image processing or the like. This will allow the usage of an ordinary digital camera or the like as the camera section 11.

The foregoing description of the embodiment has been given on the premise that the programs are prestored in the respective memories, etc. However, a program which allows the image apparatus to entirely or partially operate, or a program which allows the imaging apparatus to execute the above-described processes, may be stored in a computer-readable recording medium, such as a flexible disk, a CD-ROM (Compact Disc Read-Only Memory), a DVD (Digital Versatile Disk), or a MO (Magneto Optical disk), for distribution, and may be installed on another computer to allow the computer to operate as above-described means, or to execute the above-described steps.

The program may be stored beforehand in a disk device or the like of a server device on the Internet, and superimposed on, for example, a carrier wave and downloaded by a computer.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2004-256180 filed on Sep. 2, 2004 and including specification, claims, drawings and summary. The disclosure of the above Japanese Patent Application is incorporated herein by reference in its entirety.

What is claimed is:

1. An imaging apparatus comprising: an area acquisition section which acquires an area from which an image is to be extracted, based on an input image acquired by shooting, a stage and an original placed on the stage, along an oblique direction; a storage section which prestores information indicating a figure of a known shape; an extraction section which extracts from the input image the image corresponding to the area acquired by the area acquisition section; a parameter acquisition section which acquires a parameter for correcting the image extracted by the extraction section to an image of the original as seen from the front; and a correction section which corrects the image extracted by the extraction section to the image of the original as seen from the front using the parameter acquired by the parameter acquisition section, wherein the area acquisition section is configured to: (i) acquire straight lines representing a boundary between an area of the input image occupied by the stage and an image area of the input image occupied by the original, (ii) upon acquisition of the straight lines representing the boundary, acquire an area surrounded by the straight lines or the figure of the known shape to acquire the area from which the image is to be extracted; and (iii) when the straight lines representing the boundary are not acquired, acquire the area from which the image is to be extracted based on the prestored information indicating the figure of the known shape stored in the storage section.

2. The imaging apparatus according to claim 1, wherein the figure of the known shape represents a contour of the stage, and when the straight lines representing the boundary are not acquired, the area acquisition section acquires an area in the input image which corresponds to the stage to acquire the area from which the image is to be extracted.

3. The imaging apparatus according to claim 1, wherein the figure of the known shape is laid out on a surface of a portion of the stage where the original is to be placed, and when the straight lines representing the boundary are not acquired, the area acquisition section acquires an area in the input image which corresponds to the figure to acquire the area from which the image is to be extracted.

4. The imaging apparatus according to claim 1, wherein plural marks of known shapes are laid out on a surface of a portion of the stage where the original is to be placed, and when the straight lines representing the boundary are not acquired, the area acquisition section acquires a figure whose apexes are positions of the plural marks from the input image, and acquires an area in the input image which is occupied by the figure to acquire the area from which the image is to be extracted.

5. The imaging apparatus according to claim 1, further comprising a parameter memory section which stores the parameter acquired by the parameter acquisition section, and wherein the correction section reads the parameter stored in the parameter memory section, and corrects the image extracted by the extraction section to the image of the original as seen from the front using the read parameter.

6. The imaging apparatus according to claim 1, wherein the extraction section compresses the extracted image for each range represented by a set of pixels constituting the extracted image, and generates an image to be subjected to image processing by the correction section.

7. The imaging apparatus according to claim 1, wherein the correction section performs image processing of correcting the image extracted by the extraction section to the image of the original as seen from the front using the parameter acquired by the parameter acquisition section and compresses the image acquired by the image processing for each range represented by a set of pixels constituting the image acquired by the image processing.

8. The imaging apparatus according to claim 1, further comprising a change acquisition section which computes a change in an image based on a first image acquired by shooting the stage and the original placed on the stage at a first timing, and a second image acquired by shooting the stage and the original placed on the stage at a second timing that is different from the first timing, wherein when the change acquired by the change acquisition section is greater than a preacquired threshold, the extraction section compresses the first image for each range represented by section compresses the first image for each range represented by a set of pixels constituting the first image, and generates an image to be subjected to image processing by the correction section.

9. The imaging apparatus according to claim 1, further comprising: a change acquisition section which computes a change in image data based on a first image acquired by shooting the stage and the original placed on the stage at a first timing, and a second image acquired by shooting the stage and the original placed on the stage at a second timing that is different from the first timing; and a processing section which compresses an image obtained as a result of the correction section performing image processing for the first image, for each range represented by a set of pixels constituting the first image, when the change acquired by the change acquisition section is greater than a preacquired threshold.

10. The imaging apparatus according to claim 1, further comprising: a rotation parameter acquisition section which acquires a parameter for rotating an image, obtained through image processing by the correction section, on a coordinate plane; and a rotation correction section which rotates the image obtained through image processing by the correction section by using the parameter acquired by the rotation parameter acquisition section.

11. The imaging apparatus according to claim 10, further comprising: a zoom parameter acquisition section which acquires a parameter for zooming in or out in an image, obtained through image conversion by the rotation correction section, on a coordinate plane; and a zoom correction section which zooms in or out in the image obtained by rotation by the rotation correction section by using the parameter acquired by the zoom parameter acquisition section.

12. The imaging apparatus according to claim 1, further comprising: a zoom parameter acquisition section which acquires a parameter for zooming in or out in an image, obtained through image conversion by the correction section, on a coordinate plane; and a zoom correction section which zooms in or out in the image obtained through image processing by the correction section by using the parameter acquired by the zoom parameter acquisition section.

13. The imaging apparatus according to claim 1, further comprising: an imaging section which acquires the input image by shooting the stage and the original placed on the stage; a pole brace on which the imaging section is mounted; and a tilt detection section which detects a change in tilting of the pole brace, wherein when the change detected by the tilt detection section is greater than a preacquired value, the parameter acquisition section acquires the parameter for correcting the input image to the image as seen from the front, and the correction section corrects the input image to the image of the original as seen from the front using the parameter extracted by the parameter acquisition section.

* * * * *